(12) United States Patent
Kanao et al.

(10) Patent No.: US 12,400,640 B2
(45) Date of Patent: Aug. 26, 2025

(54) CONFERENCE SUPPORT SYSTEM AND CONFERENCE SUPPORT METHOD

(71) Applicant: SONY GROUP CORPORATION, Tokyo (JP)

(72) Inventors: Rinna Kanao, Tokyo (JP); Genki Okada, Tokyo (JP); Daisuke Inaishi, Tokyo (JP); Seiji Muramatsu, Tokyo (JP); Takanori Kubota, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 242 days.

(21) Appl. No.: 17/999,944

(22) PCT Filed: Jun. 11, 2020

(86) PCT No.: PCT/JP2020/023032
§ 371 (c)(1),
(2) Date: Nov. 28, 2022

(87) PCT Pub. No.: WO2021/250852
PCT Pub. Date: Dec. 16, 2021

(65) Prior Publication Data
US 2023/0317065 A1  Oct. 5, 2023

(51) Int. Cl.
G10L 19/00 (2013.01)
G10L 15/16 (2006.01)
(Continued)

(52) U.S. Cl.
CPC .............. *G10L 15/18* (2013.01); *G10L 15/16* (2013.01); *G10L 15/26* (2013.01)

(58) Field of Classification Search
None
See application file for complete search history.

(56) References Cited

U.S. PATENT DOCUMENTS 10,614,418 B2 * 4/2020 Shima .................... G10L 15/18
2017/0097929 A1  4/2017 Cecchi et al.
(Continued)

FOREIGN PATENT DOCUMENTS

JP  2017-215931 A  12/2017
JP  2018-063699 A   4/2018
(Continued)

OTHER PUBLICATIONS

International Search Report and Written Opinion of PCT Application No. PCT/JP2020/023032, issued on Sep. 15, 2020, 12 pages of ISRWO.

*Primary Examiner* — Satwant K Singh
(74) *Attorney, Agent, or Firm* — CHIP LAW GROUP

(57) ABSTRACT

Provided is a conference support system that includes a user information acquisition unit that acquires voice information of each of users, and an analysis unit that generates text data of each user statement on the basis of the voice information, wherein the user information acquisition unit acquires classification information of a problem proposal or problem handling assigned by the users to the text data of the user statement, and acquires classification information of a satisfaction level or a problem resolution level assigned by the users to the text data to which the classification information of the problem proposal or the problem handling is assigned.

10 Claims, 13 Drawing Sheets

(51) Int. Cl.
*G10L 15/18* (2013.01)
*G10L 15/26* (2006.01)
*G10L 21/00* (2013.01)

(56) References Cited

U.S. PATENT DOCUMENTS

| | | | |
|---|---|---|---|
| 2018/0101823 A1 | 4/2018 | Nelson | |
| 2020/0167600 A1* | 5/2020 | Michimura | H04L 65/403 |
| 2020/0175972 A1* | 6/2020 | Fan | G06F 40/279 |
| 2023/0326447 A1* | 10/2023 | Lee | G10L 15/22 |

FOREIGN PATENT DOCUMENTS

| | | |
|---|---|---|
| JP | 2018-200541 A | 12/2018 |
| JP | 2019-191977 A | 10/2019 |
| JP | 2020-086853 A | 6/2020 |
| JP | 2020-087105 A | 6/2020 |

* cited by examiner

FIG.8

| TYPE OF CONFERENCE | PATTERN | DEFINITION | PROBLEM SOLUTION LEVEL PREDICTION VALUE |
|---|---|---|---|
| UNSUCCESSFUL CONFERENCE | A | CASE WHERE NO OPINION IS PROVIDED FOR SUBJECT. | 0 |
| | B | CASE WHERE DISCUSSION IS NOT SETTLED SINCE USER PARTICIPATING IN CONFERENCE REPEAT STATEMENT OF DIFFERENT FIELD WITH RESPECT TO OPINION ASKED BY "SUBJECT" AND "PROBLEM PROPOSAL" OF CONFERENCE. | 10 |
| | C | CASE WHERE PART OF PARTICIPANT IS NOT ACTUALLY SATISFIED ALTHOUGH ALL PARTICIPANT IN CONFERENCE AGREE WITH "PROBLEM HANDLING"-ASSIGNED STATEMENT, AND DISCUSSION ON SAME "SUBJECT" IS REPEATED IN ANOTHER CONFERENCE. | 30 |
| | D | CASE WHERE STATEMENT OF "PROBLEM HANDLING" IS MADE WITH RESPECT TO "PROBLEM PROPOSAL", AND DISCUSSION IS ABOUT TO BE SETTLED TO PERFORM THE "PROBLEM HANDLING", BUT IT IS PREDICTED THAT "PROBLEM" PROPOSED BY "PROBLEM PROPOSAL" CANNOT BE SOLVED BY PERFORMANCE OF THE "PROBLEM HANDLING". | 50 |
| | E | CASE WHERE USER PARTICIPATING IN CONFERENCE CANNOT NOTICE "PROBLEM" TO BE SOLVED IN CONFERENCE, BUT IT IS LATER NOTICED THAT "PROBLEM" IS TO BE SOLVED IN CONFERENCE AND CONFERENCE FOR THE "PROBLEM" IS SET. | 50 |
| | F | CASE OF NOT APPLYING TO DEFINITION OF PATTERN A TO PATTERN D, AND PATTERN F. | 60 |
| SUCCESSFUL CONFERENCE | G | CASE WHERE BIOLOGICAL INFORMATION IS POSITIVE, CONTEXT ANALYSIS IS POSITIVE, AND NUMBER OF USER WHO ASSIGN "SATISFACTION LEVEL" AND "PROBLEM RESOLUTION LEVEL" IS EQUAL TO OR LARGER THAN MAJORITY OF CONFERENCE PARTICIPANT. | 100 |

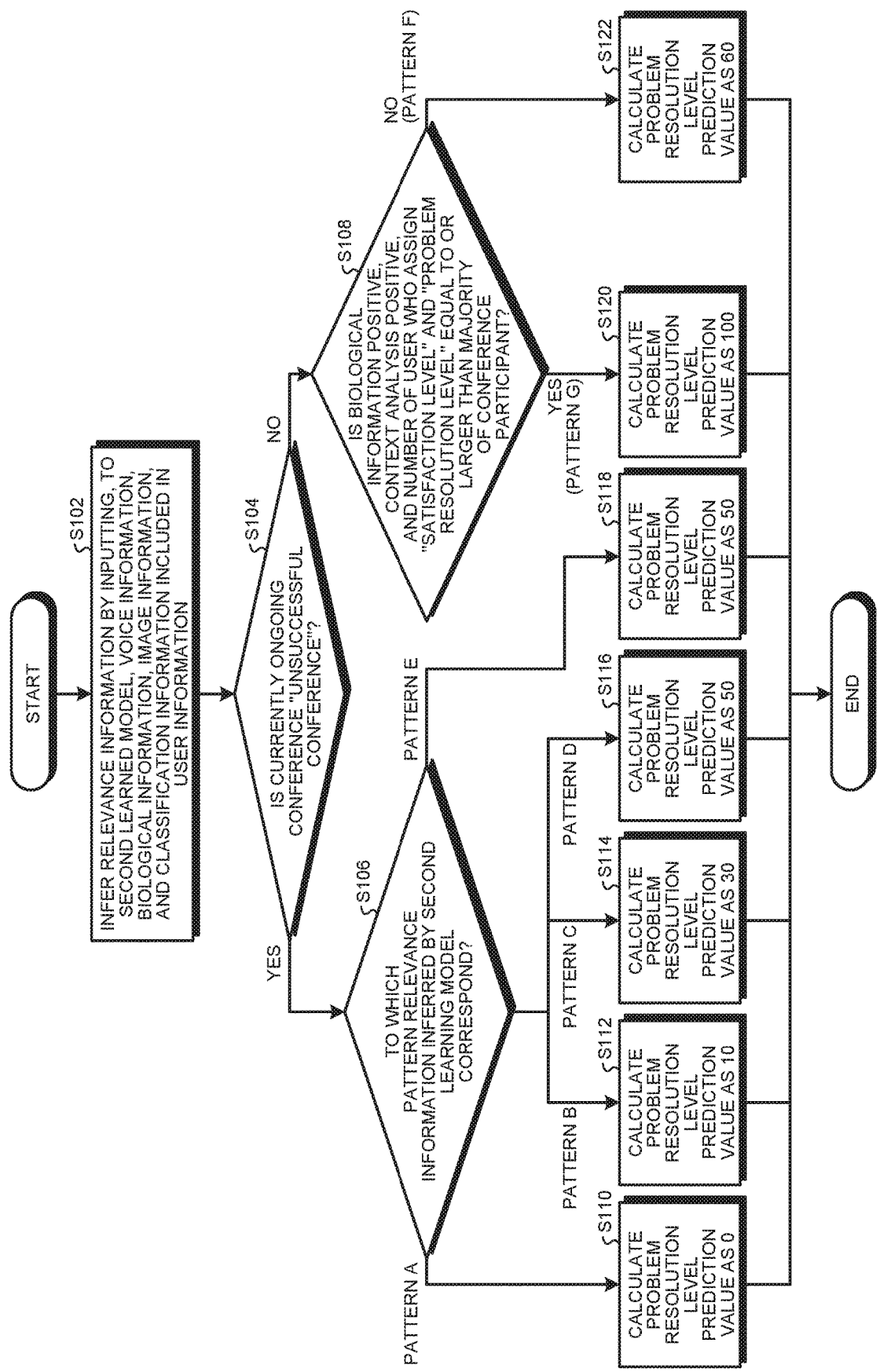

CONFERENCE SUPPORT SYSTEM AND CONFERENCE SUPPORT METHOD

CROSS REFERENCE TO RELATED APPLICATIONS

This application is a U.S. National Phase of International Patent Application No. PCT/JP2020/023032 filed on Jun. 11, 2020. Each of the above-referenced applications is hereby incorporated herein by reference in its entirety.

FIELD

The present disclosure relates to a conference support system, a conference support method, and a conference support program.

BACKGROUND

As a system that supports a conference held by a plurality of users, there are a system that visualizes biological information of users participating in the conference at the time of proceeding of the conference and proposes appropriate conference proceeding timing to alleviate stress of the users, and a technology that proposes how the users should make statements (see Patent Literature 1).

CITATION LIST

Patent Literature

Patent Literature 1: JP 2019-191977 A

SUMMARY

Technical Problem

Here, it is difficult to support proposal of a solution to a problem that is determined to be solved by a conference body and that is a reason for formation of the conference body. In addition, there is a case where it becomes necessary to change a problem itself set in a conference body since problem setting of the conference body is not appropriate, and there is a case where a solution is not presented to a problem that members of a conference body have overlooked. However, in the above-described technology, it is not considered to predict and propose a problem generated in the future during progress of a conference, or to predict and propose a problem overlooked by members of a conference body. In addition, it is difficult to improve accuracy by a proposal based only on biological information and context, and it is difficult to highly efficiently output a proposal adopted by users.

Thus, there is a demand for a technology that predicts a problem to be solved by a conference body in the future and a problem overlooked by users participating in the conference body according to progress of a conference and that accurately gives proposal according to psychological states of the users.

The present disclosure proposes a conference support system, conference support method, and conference support program capable of predicting a problem to be solved by a conference body in the future, a problem overlooked by members of the conference body, and the like according to progress of a conference, and of accurately giving proposal according to psychological states of users.

Solution to Problem

According to the present disclosure, a conference support system includes: a user information acquisition unit that acquires voice information of each of users; and an analysis unit that generates text data of each user statement on a basis of the voice information, wherein the user information acquisition unit acquires classification information of a problem proposal or problem handling assigned by the users to the text data of the user statement, and acquires classification information of a satisfaction level or a problem resolution level assigned by the users to the text data to which the classification information of the problem proposal or the problem handling is assigned.

Moreover, according to the present disclosure, a conference support method includes the steps of: acquiring voice information of a user; converting a statement of the user from the voice information into text data; acquiring classification information with respect to the text data; learning relevance between the classification information and the text data and generating a first learned model; and automatically assigning the classification information to the text data by using the first learned model.

Moreover, according to the present disclosure, a conference support program causes a computer to execute the steps of: acquiring voice information of a user, converting a statement of the user from the voice information into text data, acquiring classification information with respect to the text data, learning relevance between the classification information and the text data and generating a first learned model, and automatically assigning the classification information to the text data by using the first learned model.

BRIEF DESCRIPTION OF DRAWINGS

FIG. 8 is a description diagram for describing definitions of a "successful conference" and an "unsuccessful conference".

FIG. 9 is a flowchart illustrating a procedure of information processing by the conference progress prediction unit according to the present disclosure.

DESCRIPTION OF EMBODIMENTS

In the following, embodiments of the present disclosure will be described in detail on the basis of the drawings. Note that in each of the following embodiments, overlapped description is omitted by assignment of the same reference sign to the same parts.

Figure 1:
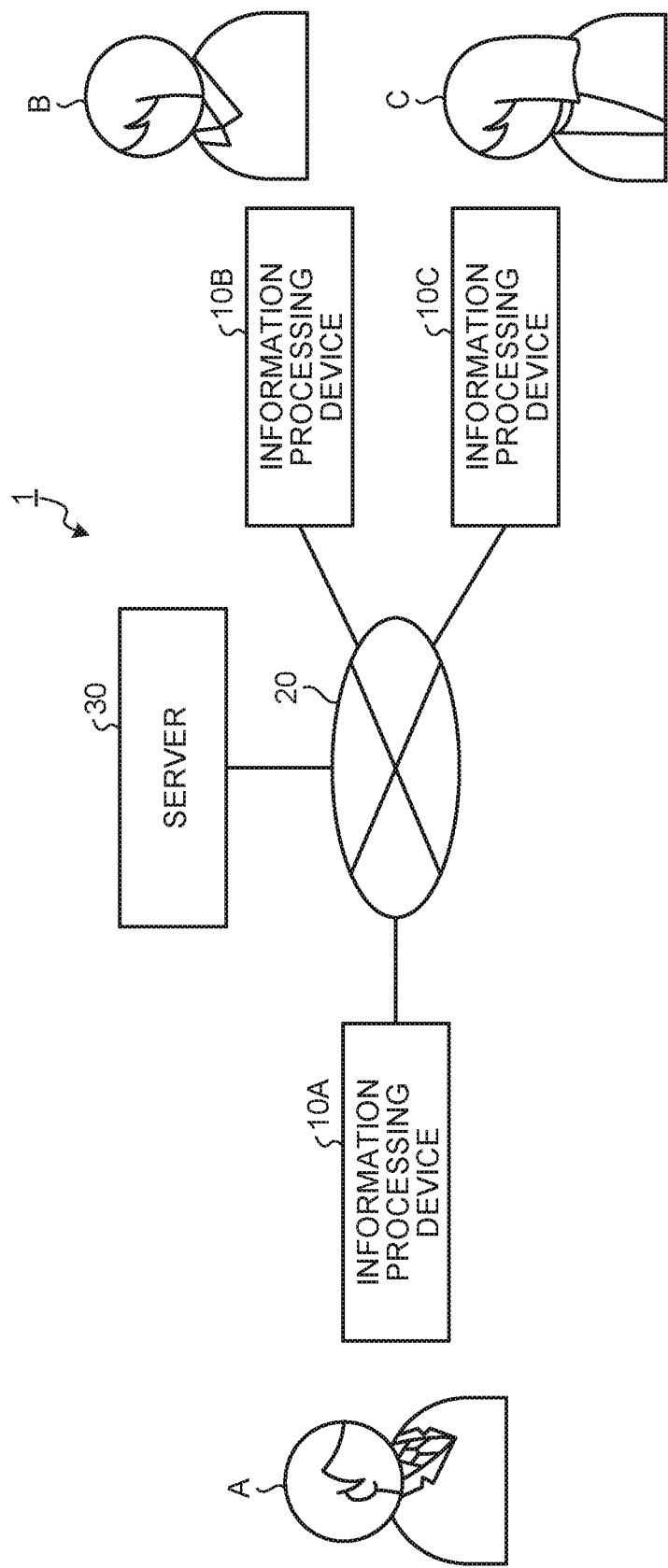
FIG. 1 is a view illustrating a configuration example of a conference support system according to an embodiment of the present disclosure.

FIG. 1 is a view illustrating a configuration example of a conference support system according to an embodiment of the present disclosure. As illustrated in FIG. 1, a conference support system 1 includes three information processing devices 10A, 10B, and 10C, a network 20, and a server 30. The information processing devices 10A, 10B, and 10C acquire statements of users, detect inputs by the users, and acquire biological information of the users. In addition, the information processing devices 10A, 10B, and 10C have basically similar functions except that arrangement positions are different. Hereinafter, similar descriptions of the information processing devices 10A, 10B, and 10C will be made as a description of an information processing device 10. The information processing devices 10A, 10B, and 10C are respectively arranged for three users (user A, user B, and user C) participating in a conference. Note that the conference support system 1 only needs to include at least one information processing device although the three information processing devices 10A, 10B, and 10C are arranged in the present embodiment. Furthermore, there may be a plurality of users for one information processing device 10 although a case where there is one user for one information processing device 10 is assumed in the present embodiment. Each of the information processing devices 10 has a function of identifying a plurality of users. The network 20 connects the information processing devices 10A, 10B, and 10C. The network 20 may be a public communication network, or a communication network not connected to a public wireless communication network. The network 20 may transmit information between the information processing devices 10 by using wireless communication or wired communication. The server 30 is connected to the information processing devices 10A, 10B, and 10C through the network 20. The server 30 may execute functions of the information processing devices 10A, 10B, and 10C (described later). That is, the server 30 may be connected to the information processing devices 10 through the network and become a part of the information processing devices 10.

(Information Processing Device)

Figure 2:
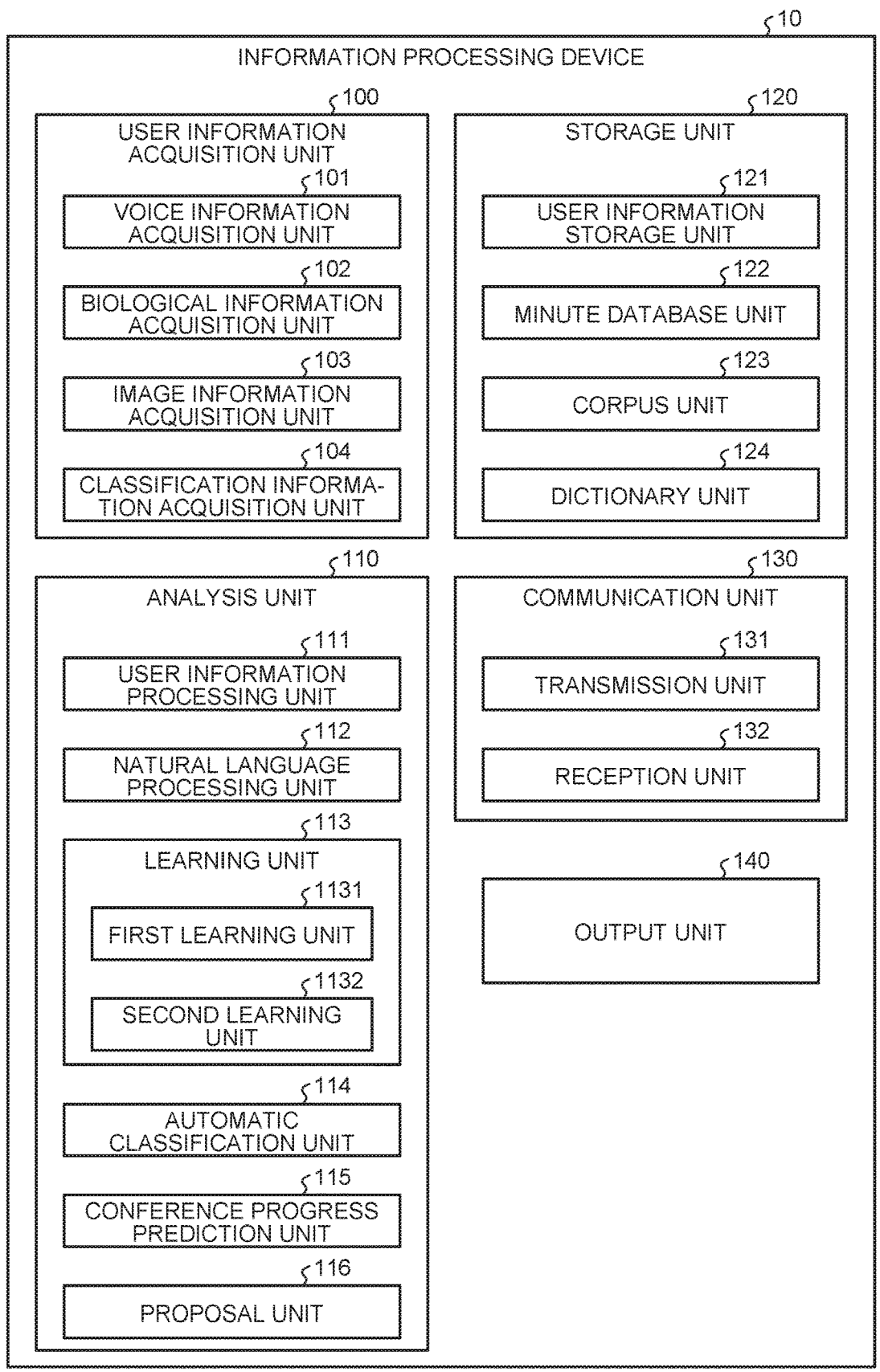
FIG. 2 is a view illustrating a configuration example of an information processing device according to the embodiment of the present disclosure.

FIG. 2 is a view illustrating a configuration example of an information processing device according to the present embodiment of the present disclosure. Each of the information processing devices 10 according to the present disclosure includes a user information acquisition unit 100, an analysis unit 110, a storage unit 120, a communication unit 130, and an output unit 140. The user information acquisition unit 100 includes a voice information acquisition unit 101, a biological information acquisition unit 102, an image information acquisition unit 103, and a classification information acquisition unit 104. The analysis unit 110 includes a user information processing unit 111, a natural language processing unit 112, a learning unit 113, an automatic classification unit 114, a conference progress prediction unit 115, and a proposal unit 116. The storage unit 120 includes a user information storage unit 121, a minutes database unit 122, a corpus unit 123, and a dictionary unit 124. The communication unit 130 includes a transmission unit 131 and a reception unit 132.

(User Information Acquisition Unit)

The user information acquisition unit 100 includes the voice information acquisition unit 101 that acquires a voice of a user participating in a conference, the biological information acquisition unit 102 that acquires biological information of the user, the image information acquisition unit 103 that acquires an image of a facial expression of the user, and the classification information acquisition unit 104 that acquires, after converting the voice of the user into text data, classification information (annotation label) assigned to the text data by the user. The user information acquisition unit 100 acquires user information of a user participating in a conference while the conference is in progress. Next, components of the user information acquisition unit 100 will be described.

(Voice Information Acquisition Unit)

The voice information acquisition unit 101 acquires a voice of a user participating in a conference. The voice information acquisition unit 101 includes a voice input device such as a microphone installed in a conference room. The voice information acquisition unit 101 outputs, to a voice information processing unit 200, voice data acquired by the voice input device.

(Biological Information Acquisition Unit)

By using various biological sensors, the biological information acquisition unit 102 acquires biological information of a user participating in the conference. Examples of the biological sensors include a pulse rate meter, a heart rate meter, an electrodermal activity sensor, a sphygmomanometer, a perspiration meter, an activity meter, a blood oxygen level sensor, an infrared sensor, a deep body thermometer, an eye gaze detecting camera, and an eye potential sensor. The biological information acquisition unit 102 acquires data of an index of an autonomic nerve system activity (such as pulse rate, heart rate, skin conductance, blood pressure value, perspiration amount, respiration, or skin temperature/deep body temperature) of the user which index is measured by the biological sensor, and data of an index of an eye gaze activity (such as eye gaze motion/pupil diameter/blink frequency). The biological information acquisition unit 102 only needs to acquire at least one piece of biological information, and the number of pieces of acquired biological information is not limited. The biological information acquisition unit 102 of the present embodiment acquires a pulse rate of the user participating in the conference by using the pulse rate meter as the biological sensor.

(Image Information Acquisition Unit)

By using a camera, the image information acquisition unit 103 acquires an image of a facial expression of a user participating in the conference. The image information acquisition unit 103 may acquire images of the facial expression of the user from different angles by using a plurality of cameras. The camera includes an optical system, an imaging element such as a complementary metal oxide semiconductor (CMOS) or a charge coupled device (CCD), and an image processing circuit.

(Classification Information Acquisition Unit)

The classification information acquisition unit 104 acquires classification information (annotation label) of text data of a statement which classification information is assigned by a user who checks the text data converted by the analysis unit 110 and output from the output unit 140. As the classification information assigned to the text data of the statement, there are "problem proposal", "problem handling", a "satisfaction level", and a "problem resolution level".

The "problem proposal" is the classification information assigned in a case where a user who checks the text data of the statement of the user participating in the conference which text data is output from the output unit 140 determines that the statement proposes a problem to be solved in the conference. The "problem handling" is the classification information assigned in a case where the user who checks the text data of the statement of the user participating in the conference which text data is output to the output unit 140 determines that the statement is a countermeasure to the problem to be solved in the conference. For example, in a case where the classification information of the "problem proposal" is assigned to a statement of a user participating in a conference and another user participating in the conference makes a statement such as "How about contacting Mr. A?" or makes a statement such as "How about checking B?", the classification information of the "problem handling" is assigned to text data of the statement. Furthermore, the "satisfaction level" included in the classification information is the classification information assigned in a case where the user who checks the text data of the statement of the user participating in the conference which text data is output to the output unit 140 feels satisfied with the statement. The "problem resolution level" included in the classification information is the classification information assigned in a case where it is determined that the problem proposed in the conference is resolved by a statement to which the classification information of the "problem handling" is assigned among statements of the users participating in the conference which statements are output to the output unit 140. Note that the classification information can be assigned by a user or by automatic classification using a program learned on the basis of determination information of the user, or the like.

The classification information acquisition unit 104 stores the acquired classification information and the text data into the storage unit 120 in association with each other.

(Analysis Unit)

The analysis unit 110 executes analysis on the basis of various kinds of information acquired by the user information acquisition unit 100 and data stored in the storage unit 120, and executes analysis of a conference held by the conference support system 1 and support of the conference. The analysis unit 110 includes the user information processing unit 111, the natural language processing unit, the learning unit 113, the automatic classification unit 114, the conference progress prediction unit 115, and the proposal unit 116. The analysis unit 110 analyzes and learns the user information of the users participating in the conference which user information is acquired by the user information acquisition unit 100, generates a learned model, and performs inference by using the learned model.

(User Information Processing Unit)

Figure 3:
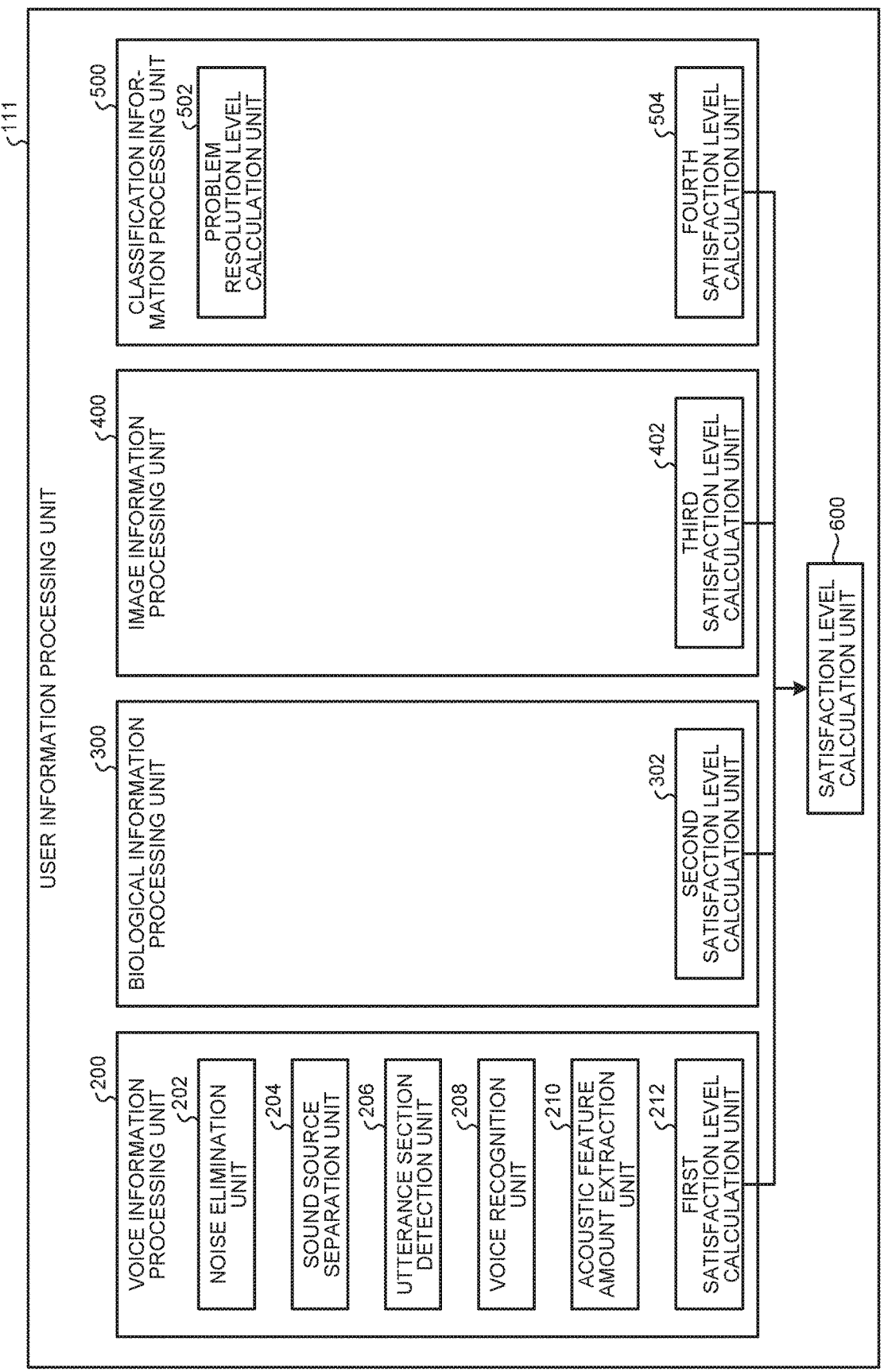
FIG. 3 is a view illustrating a configuration example of a user information processing unit according to the present disclosure.
Figure 4:
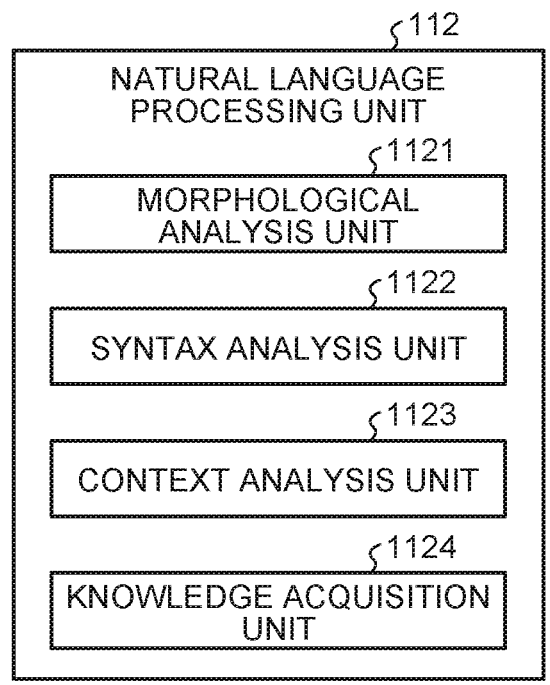
FIG. 4 is a view illustrating a configuration example of a conference progress prediction unit according to the present disclosure.

FIG. 3 is a view illustrating a configuration example of a user information processing unit according to the present disclosure. As illustrated in FIG. 4, the user information processing unit 111 includes a voice information processing unit 200, a biological information processing unit 300, an image information processing unit 400, and a classification information processing unit 500.

(Voice Information Processing Unit)

The voice information processing unit 200 performs voice processing on the voice information acquired by the voice information acquisition unit 101. The voice information processing unit 200 includes a noise elimination unit 202, a sound source separation unit 204, an utterance section detection unit 206, a voice recognition unit 208, and an acoustic feature amount extraction unit 210.

The noise elimination unit 202 eliminates noise included in the voice information acquired by the voice information acquisition unit 101. For example, the noise elimination unit 202 specifies noise from a difference between voice acquired from a microphone arranged near a noise source and voice acquired from other microphones, and eliminates the noise. The noise elimination unit 202 may eliminate noise by using a correlation between voices input to a plurality of microphones.

The sound source separation unit 204 targets voice data from which noise is eliminated by the noise elimination unit 202, and specifies a sound source (speaker) of each voice. The sound source separation unit 204 specifies a speaker by calculating a direction and distance of each speaker with respect to the microphones from a time difference in which voice is input to the plurality of microphones.

The utterance section detection unit 206 detects a group of utterance by one speaker as an utterance section with respect to the voice data separated by the sound source separation unit 204. As a method of detecting the utterance section, any known method such as a method using a speech model or spectrum entropy can be used.

The voice recognition unit 208 performs voice recognition processing on a group of voice data detected by the utterance section detection unit 206, and converts the voice data into text data. Specifically, after being converted into a sound waveform, voice is converted into text data by utilization of a recognition decoder including an acoustic model, a language model, and an utterance dictionary. The acoustic model discriminates voice by using an analysis of a frequency component or a temporal change of a sound waveform. Specifically, a sound waveform is cut out and a feature amount is quantified, and then the discrimination is performed by calculation of to which phoneme model and in which degree the feature amount is close. The language model evaluates whether a character string or a word string verbalized by the acoustic model is appropriate as Japanese. The language model is acquired by collection and statistical processing of a large number of Japanese texts. A pronunciation dictionary is a dictionary that records a relationship between a word and a phoneme string of reading of the word. Since the acoustic model is modeled for each phoneme that is the smallest unit of sound, acoustic models of phonemes are coupled according to the pronunciation dictionary and an acoustic model of a word corresponding to word utterance is configured. That is, after performing an acoustic analysis on the voice data acquired by the voice information acquisition unit 101 by using the recognition decoder in which the acoustic model, the language model, and the utterance dictionary are combined, the voice recognition unit 208 performs conversion into text data by using deep learning. The voice recognition unit 208 outputs the text data that is a result of the voice recognition, and also calculates and outputs reliability of the voice recognition result.

The acoustic feature amount extraction unit 210 calculates an acoustic feature amount (acoustic feature amount) of the voice data. Examples of the acoustic feature amount include a sound pressure level, a fundamental frequency, an utterance length, an utterance speed, an average mora length, overlapping of utterance, an interval of utterance, and the like. In the present embodiment, the acoustic feature amount extraction unit 210 extracts a tone of voice, that is, the fundamental frequency.

With time-series data of the acoustic feature amount calculated by the acoustic feature amount extraction unit 210 being an input, a first satisfaction level calculation unit 212 calculates a satisfaction level of each of users participating in the conference for each unit time on the basis of a database of a correlation between the acoustic feature amount and the satisfaction level. As data of the correlation between the acoustic feature amount and the satisfaction level, there is a relationship between the fundamental frequency and the satisfaction level. Since there is a correlation in which the satisfaction level becomes high in a case where the fundamental frequency is high, the first satisfaction level calculation unit 212 calculates a first satisfaction level for each of the users participating in the conference from the correlation between the fundamental frequency and the satisfaction level by using the fundamental frequency extracted by the acoustic feature amount extraction unit 210. For example, the first satisfaction level calculation unit 212 calculates the first satisfaction level as a numerical value in a specific range from 0 (dissatisfaction) to 50 (satisfaction).

(Biological Information Processing Unit)

The biological information processing unit 300 processes the biological information acquired by the biological information acquisition unit 102. The biological information processing unit 300 includes a second satisfaction level calculation unit 302.

In the present embodiment, the second satisfaction level calculation unit 302 calculates a second satisfaction level indicating a satisfaction level of each of the users participating in the conference on the basis of a pulse rate acquired by the biological information acquisition unit 102. Specifically, when the pulse rate increases, it is considered that the user is in a tense state, and the second satisfaction level is calculated to be low. When the pulse rate decreases, it is considered that the user is in a relaxed state, and the second satisfaction level is calculated to be high.

Emotion can be also estimated by a relationship between fluctuation of the pulse rate and the emotion. The emotion may be estimated by recording of data of the relationship between the fluctuation of the pulse rate and the emotion into the storage unit 120, and collation of fluctuation of the pulse rate acquired by the pulse rate meter with the data of the relationship between the fluctuation of the pulse rate and the emotion which data is recorded in the storage unit 120.

The second satisfaction level calculation unit 302 calculates the second satisfaction level by the method described above. For example, the second satisfaction level calculation unit 302 may calculate the second satisfaction level as a numerical value in a range from 0 (dissatisfaction) to 50 (satisfaction).

(Image Information Processing Unit)

The image information processing unit 400 processes the image information acquired by the image information acquisition unit 103. The image information processing unit 400 includes a third satisfaction level calculation unit 402.

The third satisfaction level calculation unit 402 analyzes emotions of the users participating in the conference by using image information of facial expressions of the users participating in the conference which image information is acquired by the image information acquisition unit 103. The third satisfaction level calculation unit 402 includes, for example, a facial expression analysis tool such as a facial action coding system (FACS). The facial action coding system (FACS) is a facial expression analysis tool/facial expression theory developed by Paul Ekman, Wallance Friesen, and the like in 1978 to comprehensively measure a visible face movement. In addition, a known analysis technique other than the above technique may be used.

The third satisfaction level calculation unit 402 calculates a third satisfaction level on the basis of a numerical value of an emotion of "joy" classified as a positive emotion and numerical values of emotions of "disgust", "anger", "sadness", "contempt", "fear", and "surprise" classified as negative emotions among the calculated emotions. The third satisfaction level calculation unit 402 may calculate the third satisfaction level as a value in a range from 0 (dissatisfaction) to 50 (satisfaction).

(Classification Information Processing Unit)

The classification information processing unit 500 processes the classification information acquired by the classification information acquisition unit 104. The classification information processing unit 500 includes a problem resolution level calculation unit 502 and a fourth satisfaction level calculation unit 504.

The problem resolution level calculation unit 502 calculates a problem resolution level indicating a degree to which a problem proposed in the conference is resolved by a statement of a user participating in the conference (statement to which classification information of problem handling is assigned). The problem resolution level calculation unit 502 counts the number of users who assign the classification information of the problem resolution level to the text data to which the classification information of the problem handling is assigned. In a case where all the users participating in the conference assign the classification information of the problem resolution level, the problem resolution level is calculated as 100. In a case where a part of the users participating in the conference assigns the classification information of the problem resolution level, a value acquired by division of the number of users who assign the classification information of the problem resolution level by the number of all the users participating in the conference is multiplied by 100, whereby the problem resolution level is calculated. In a case where none of the users participating in the conference assigns the classification information of the problem resolution level, the problem resolution level calculation unit 502 calculates the problem resolution level as 0. As a result, the problem resolution level calculation unit 502 calculates the problem resolution level with respect to the statement to which the problem handling is assigned.

The fourth satisfaction level calculation unit 504 counts, with respect to each of the users participating in the conference, the number of times of assignment of the classification information of the satisfaction level. The fourth satisfaction level calculation unit 504 calculates the fourth satisfaction level of a user who participates in the conference and assigns the classification information of the satisfaction level as 50 (satisfaction), and calculates the fourth satisfaction level of a user who does not assign the classification information of the satisfaction level as 0 (dissatisfaction).

(Satisfaction Level Calculation Unit)

A satisfaction level calculation unit 600 calculates a total value of the satisfaction levels of each of the users participating in the conference by adding up, for each of the users participating in the conference, the first satisfaction level calculated by the first satisfaction level calculation unit 212 included in the voice information processing unit 200, the second satisfaction level calculated by the second satisfaction level calculation unit 302 included in the biological information processing unit 300, the third satisfaction level calculated by the third satisfaction level calculation unit 402 included in the image information processing unit 400, and the fourth satisfaction level calculated by the fourth satisfaction level calculation unit 504 included in the classification information processing unit 500.

(Natural Language Processing Unit)

The natural language processing unit 112 performs natural language processing including a morphological analysis, syntax analysis, context analysis, and knowledge acquisition on the text data acquired by conversion of the voice information of the users participating in the conference by the voice information processing unit 200. In the present embodiment, with a statement at the conference being an input, the natural language processing unit 112 determines whether a statement of an opinion related to a subject is made.

Figure 5:
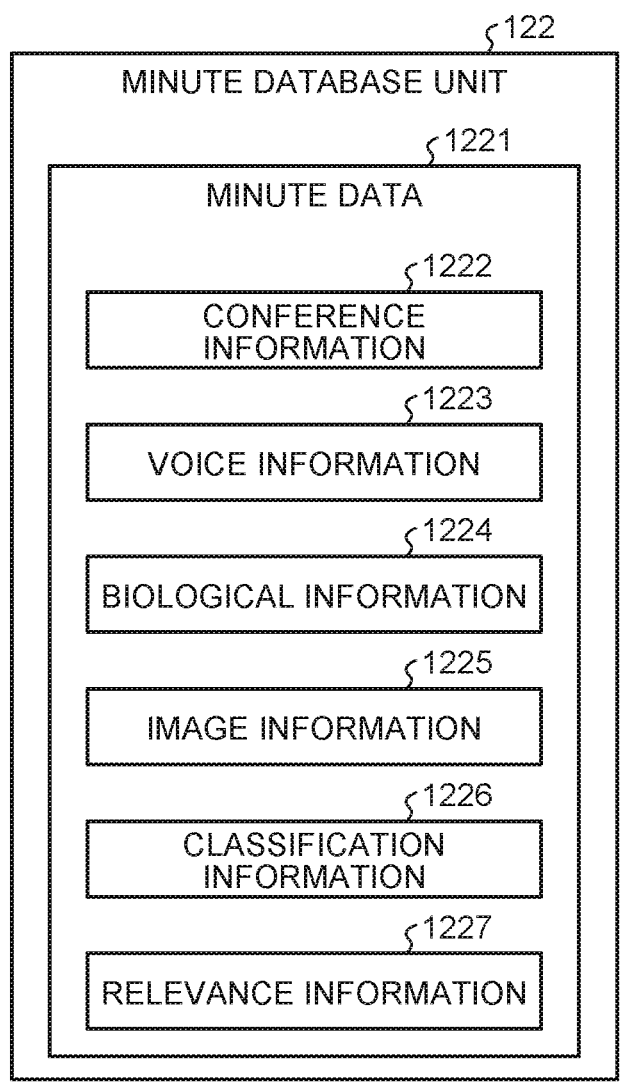
FIG. 5 is a view illustrating a configuration example of minutes data according to the present disclosure.

FIG. 4 is a view illustrating a configuration example of the natural language processing unit according to the present disclosure. As illustrated in FIG. 5, the natural language processing unit 112 includes a morphological analysis unit 1121, a syntax analysis unit 1122, a context analysis unit 1123, and a knowledge acquisition unit 1124.

The morphological analysis unit 1121 executes the morphological analysis on a text included in the text data acquired by conversion of the voice information. The morphological analysis is an analysis of dividing a sentence included in the text data into a string of morphemes on the basis of a grammar of a target language and information such as a part of speech of a word, which information is called a dictionary, from the text data in a natural language without a note of grammatical information, and discriminating a part of speech or the like of each morpheme. For example, MeCab can be used as the morphological analysis unit 1121. In addition, a morphological analysis engine JUMAN may be used.

The syntax analysis unit 1122 performs the syntax analysis on the data divided into the string of morphemes by the morphological analysis unit 1121. The syntax analysis unit 1122 executes the syntax analysis by using information stored in the corpus unit 123 of the storage unit 120. The syntax analysis is a method of analyzing a structure of a sentence from text data in a natural language. That is, the syntax analysis unit 1122 specifies a structure of a sentence by organizing a positional relationship (such as relationship of dependency) between morphemes included in a sentence of the text data in the natural language, and expressing the positional relationship with a syntax tree. As the syntax analysis unit 1122, for example, Cabocha, KNP, or the like using a support vector machine is used. Cabocha is syntax analysis software used in combination with Mecab that is a morphological analysis engine. With an analysis result (morpheme string) of JUMAN that is a morphological analysis engine being an input, KNP analyzes a dependency relationship, a case relationship, and an anaphoric relationship between clauses and basic phrases.

With respect to the text data acquired by conversion of the voice information, the context analysis unit 1123 executes the context analysis on a statement to which the classification information of the "problem handling" corresponding to the statement labeled with the classification information of the "problem proposal" by the users participating in the conference is assigned. That is, the context analysis unit 1123 analyzes a relationship between a sentence of the statement to which the classification information of the "problem proposal" is assigned and a sentence of the statement to which the classification information of the "problem handling" is assigned. Bidirectional encoder representations from transformers (BERT) can be used as the context analysis unit 1123. In addition, XLNet having a property of simultaneously handling forward and backward information while using an autoregressive language model that learns dependency between words to be predicted, A Light BERT (ALBERT) that is a lightweight version of BERT, or the like may be used.

The knowledge acquisition unit 1124 executes the knowledge acquisition from a text included in data acquired by conversion of the voice information acquired by the voice information acquisition unit 101 into the text data. The knowledge acquisition is a natural language processing technique of automatically acquiring knowledge from texts of text data in a natural language. The knowledge acquisition unit 1124 can acquire knowledge from text data included in minutes data 122 and store the acquired knowledge as information corresponding to the text data of the minutes data 122.

(Learning Unit)

The learning unit 113 includes a first learning unit 1131 and a second learning unit 1132. The learning unit 113 creates training data created from data of user information acquired from the users participating in the conference and minutes data generated by utilization of the user information, and generates a learned model. The learning unit 113 may create a learned model by learning, as unsupervised data, data of user information acquired from the users participating in the conference and minutes data generated by utilization of the user information. Each of the first learning unit 1131 and the second learning unit 1132 creates a learned model. The number of learned models created by each of the first learning unit 1131 and the second learning unit 1132 is not limited to one, and a plurality of learned models may be included on the basis of specifications thereof, a purpose, information to be input, and information to be output.

The first learning unit 1131 learns relevance between the text data acquired by conversion of the voice information, which is acquired by the user information acquisition unit 100, by the voice information processing unit 200 and the classification information assigned by the users, and creates a first learned model. The first learning unit 1131 processes text data of statements of the users during the conference by the first learned model, and determines classification information with respect to the text data. That is, the first learning unit 1131 creates a learned model in which a characteristic how a user participating in the conference assigns classification information (problem proposal, problem handling, satisfaction level, and problem resolution level) to text data of a statement of a user (another user) participating in the conference, and assigns the classification information with respect to the statement by using the learned model. BERT can be used as the first learning unit 1131. BERT is a distributed representation computation mechanism that can be used generally with respect to various kinds of natural language processing. Note that the first learning unit 1131 of the present embodiment performs supervised learning with the training data to which the classification information is assigned by the users. However, a learned model may be created by unsupervised learning with provision of the classification information. In this case, after data is accumulated in the minutes database unit 122 of the storage unit 120, relearning may be performed with the accumulated data as training data.

The second learning unit 1132 learns minutes data 1221 recorded in the minutes database unit 122 of the storage unit 120 by using unsupervised learning (such as K-MEANS clustering, for example), and generates a second learned model. The unsupervised learning is a method of generating a learned model by extracting a relationship between pieces of data without a label by using predetermined data. The second learning unit 1132 learns a feature amount of the minutes data 1221 and generates the second learned model of a relationship between pieces of data included in the minutes data 1221. The second learned model learns a status of the conference on the basis of a statement, an evaluation input with respect to the statement, and information of various reactions of the users, the statement, evaluation, and information being included in the minutes data 1221. In the second learned model, user information of the currently ongoing conference which user information is acquired by the user information acquisition unit 100 is an input, and an evaluation of the conference is an output.

With the user information that includes the voice information, the biological information, the image information, and the classification information and that is acquired by the user information acquisition unit 100 being an input, the second learned model infers the data included in the minutes data 1221. For example, when the voice information processing unit 200 extracts the fundamental frequency from the voice information acquired by the voice information acquisition unit 101 included in the user information acquisition unit 100 and inputs the fundamental frequency to the second learned model, data of relevance information 1227 included in the minutes data 1221 is inferred from a feature amount of the fundamental frequency. In addition, accuracy of the inference can be made higher when an amount of information input to the second learned model is larger. That is, when the biological information, the image information, and the classification information are further input to the second learned model generated by the second learning unit 1132 in addition to the voice information acquired by the user information acquisition unit 100, it is possible to increase the accuracy of the inference of the relevance information 1227.

More specifically, in the second learned model, when the voice information of the users participating in the conference (including information converted into text data by the voice information processing unit 200), the pulse rates of the users, and the image information of the facial expressions of the users are input, the relevance information 1227 assigned to the currently ongoing conference is calculated. That is, the second learned model calculates to which one of a "successful conference" and an "unsuccessful conference" and to a conference classified into which pattern the currently ongoing conference corresponds. Thus, by using the second learned model, it is possible to determine whether the currently ongoing conference is likely to be the "successful conference" or the "unsuccessful conference" on the basis of the user information of the currently ongoing conference.

(Automatic Classification Unit)

The automatic classification unit 114 automatically classifies text data of statements of the users of the currently ongoing conference by using the first learned model created by the first learning unit 1131. The automatic classification unit 114 inputs the text data of the statements of the users of the currently ongoing conference into the first learned model of the first learning unit 1131, and acquires classification information output from the first learning unit 1131. As a result, the automatic classification unit 114 acquires information indicating which one of the "problem proposal", the "problem handling", and "others" the text data is classified into.

Furthermore, in a case where the text data of the statement is classified into the "problem handling", by using the first learned model, the automatic classification unit 114 calculates, with respect to the text data of the "problem handling", how many users among the users participating in the conference assign the classification information of the "satisfaction level" to the text data. The automatic classification unit 114 transmits an inferred result to the output unit 140. In such a manner, the automatic classification unit 114 automatically classifies the statements of the users at the currently ongoing conference.

(Conference Progress Prediction Unit)

The conference progress prediction unit 115 predicts progress of the currently ongoing conference (whether the conference is likely to be the "successful conference" or the "unsuccessful conference") by using the second learned model of the second learning unit 1132. The conference progress prediction unit 115 inputs the user information acquired by the user information acquisition unit 100 into the second learning unit 1132, and acquires a determination result that is calculated by the second learned model and that indicates whether the currently ongoing conference is likely to be the "successful conference" or the "unsuccessful conference". The conference progress prediction unit 115 calculates a problem resolution level prediction value on the basis of information on the determination result.

(Proposal Unit)

By using the second learned model of the second learning unit 1132, the proposal unit 116 proposes "problem handling" to a "problem proposal"-assigned statement, which is made by a user participating in the currently ongoing conference, with reference to minutes data 1221 of a similar conference which data is included in the minutes database unit 122. In addition, in a case where the conference progress prediction unit 115 predicts that the currently ongoing conference becomes the "unsuccessful conference", the proposal unit 116 proposes, by using the second learned model of the second learning unit 1132, a "topic change", a "problem proposal" assumed in the future, "problem handling" with respect to a "problem proposal" in the currently ongoing conference, and the like to the users participating in the conference.

(Storage Unit)

The storage unit 120 may use a temporary storage medium such as a read only memoly (ROM) or a ramdom access memoly (RAM). In addition, a magnetic storage medium such as a magnetic tape or a hard disk drive (HDD) may be used, and a nonvolatile memory such as an ellectrically erasable programmable read only memoly (EEPROM), a flash memoly, a magnetoresistive ramdom access memoly (MRAM), a ferroelectric ramdom access memoly (FeRAM), or a phase change ramdom access memoly (PRAM) may be used.

The storage unit 120 includes the user information storage unit 121, the minutes database unit 122, the corpus unit 123, and the dictionary unit 124. The user information storage unit 121 records the user information acquired by the user information acquisition unit 100 including the voice information acquisition unit 101, the biological information acquisition unit 102, and the image information acquisition unit 103.

(Minutes Database Unit)

The minutes database unit 122 stores minutes data 1221 of a past conference. The data included in the minutes data 1221 may be only text data of statements of the users participating in the conference, or may be information in which the classification information of the "problem proposal", the "problem handling", the "satisfaction level", and "problem resolution" is assigned to the text data.

FIG. 5 is a schematic diagram illustrating information included in the minutes data. The minutes data 1221 illustrated in FIG. 5 is data including conference information 1222, voice information 1223, biological information 1224, image information 1225, classification information 1226, and relevance information 1227. The conference information 1222 is data including a conference date and time, a conference place, conference participants, a subject, and the like. The voice information 1223 is data generated when the voice information acquisition unit 101 acquires voices of the users participating in the conference. The biological information 1224 is data generated when the biological information acquisition unit 102 acquires biological information of the users participating in the conference. The image information 1225 is data generated when the image information acquisition unit 103 acquires image information of facial expressions of the users participating in the conference. The classification information 1226 is data generated when the classification information acquisition unit 104 acquires the classification information assigned by the users participating in the conference. Note that the biological information 1224 is a tone of voice, that is, the fundamental frequency, and the biological information 1224 is a pulse rate in the present embodiment.

The relevance information 1227 includes information indicating whether the conference is successful or unsuccessful. The information indicating whether the conference is successful or unsuccessful may be classified according to reasons why the conference is unsuccessful. As patterns in which the conference becomes unsuccessful, for example, there are a case where the same "subject" is set again and a conference is held since users participating in the conference make no statement, a case where the same "subject" is set again and a conference is held since users participating in the conference repeat statements in a different field with respect to a "subject" and "problem proposal" and discussion is not settled, a case where a part of participants is not actually satisfied and a discussion on the same "subject" is repeated in another conference although all the participants in the conference apparently agree with "problem handling" proposed in the conference, a case where a conference is held on the same "problem" again since the "problem" is not solved although all participants of the conference agree with "problem handling" stated by a user in the conference and the "problem handling" that is regarded as a conclusion of the conference is executed, and a case where users participating in a conference cannot notice a "problem" to be solved in the conference and notices the "problem" to be solved in the conference later and a conference is set for the "problem".

Furthermore, the relevance information 1227 also includes information related to relevance between minutes data of an individual conference and minutes data of another conference. The relevance is information such as conferences with the same subject, and conferences with the same participants. In addition, with respect to each of the above-described unsuccessful conferences and conferences held again because of those, an unsuccessful pattern and the relevance may be associated. The information that is related to the relevance of individual conference and that can be assigned as the relevance information is not limited to the above, and the users may provide arbitrary relevance information.

(Corpus Unit)

The corpus unit 123 is acquired by structuring of texts in a natural language into language data that can be searched by a computer and integration of the language data on a large scale. For example, a Japanese corpus called KOTONOHA developed by the National Institute for Japanese Language and Linguistics can be used. The data stored in the corpus unit 123 is used in the processing by the natural language processing unit 112.

(Dictionary Unit)

The dictionary unit 124 is a database in which knowledge necessary for natural language processing regarding words is accumulated. The dictionary unit 124 may record meaning, pronunciation, right and left connectivity, inflection, notation fluctuation, surface case frame, and the like of the words. As the dictionary unit 124, for example, an IPA dictionary (ipadic) mounted on Mecab as a standard function can be used. The data stored in the dictionary unit 124 is used in the processing by the natural language processing unit 112.

(Communication Unit)

The communication unit 130 includes a transmission unit 131 and a reception unit 132. The communication unit 130 performs data communication by wireless communication or wired communication. In a case of the wireless communication, a communication antenna, an RF circuit, and another communication processing circuit may be included. In a case of the wired communication, for example, a LAN terminal, a transmission circuit, and another communication processing circuit may be included. The information processing device 10 is connected to the network 20 through the communication unit 130.

(Output Unit)

The output unit 140 visually or auditorially notifies the users of information related to the conference. As the output unit 140, a cathode-ray tube (CRT) display device, a liquid crystal display device, a plasma display device, an organic electro luminescence (EL) display device, a micro light emitting diode (LED) display device, or the like can be used as a device that gives visual notification. A multifunction machine having a printing function may also be used. That is, the conference may be supported by printing and outputting of information related to the conference on paper. In a case where notification is given auditorially, the output unit 140 may be a speaker, a headphone, or an earphone. The earphone may be a wireless earphone. In a case of the wireless earphone, information related to the conference may be received from the information processing device 10 by utilization of a communication means such as BLUETHOOTH (registered trademark), and the information related to the conference may be output as sound.

Next, processing by the conference support system 1 and the information processing device 10 will be described in the following order.

1. Acquisition of user information at the time of progress of a conference
2. Analysis and learning based on user information
3. Analysis of user information, and creation of classification information based on learning
4. Analysis of user information, and evaluation and proposal based on learning 1. Acquisition of User Information According to Progress of a Conference The conference support system 1 acquires user information at the time of a conference. Hereinafter, processing in which the conference support system 1 acquires user data from an ongoing conference and further assigns classification information on the basis of an input by a user will be described. The conference support system 1 also acquires user data in a case of determining support to be provided to the ongoing conference.

In the information processing device 10, the voice information acquisition unit 101 acquires voice, and the voice information processing unit 200 of the user information processing unit 111 performs processing, specifies a user who makes a statement, and generates text data from the voice. The information processing device 10 outputs the created text data to the output unit 140 in association with the user. The information processing device 10 detects classification information input with respect to an image displayed on the output unit 140.

Figure 6:
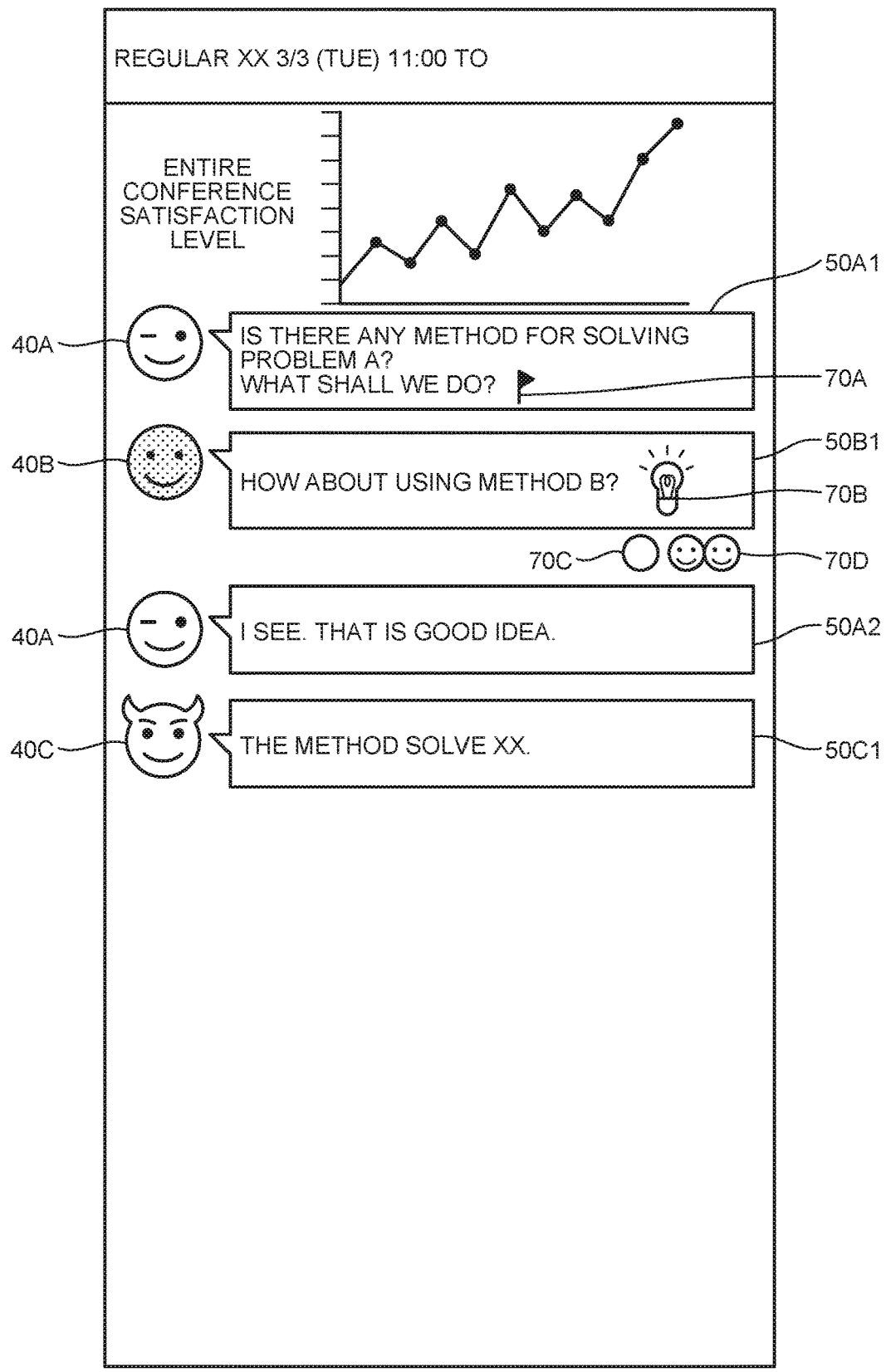
FIG. 6 is a schematic diagram of a conference progress status display displayed on an output unit of the information processing device.

FIG. 6 is a schematic diagram of a conference progress status display displayed on the output unit of the information processing device. An example of classification information assignment processing will be described with reference to FIG. 6. When a first user participating in a conference states "Is there any method for solving a problem A? What shall we do?", the voice information acquisition unit 101 acquires voice information of the statement. The voice information processing unit 200 converts the voice information into text data, and outputs text data 50A1 of the statement to the output unit 140 together with a mark 40A of the first user.

Then, when a second user who listens to the text data 50A1 states "How about using a method B?", the voice information acquisition unit 101 acquires voice information of the statement of the second user, and the voice information processing unit 200 converts the voice information into text data and outputs text data 50B1 of the statement to the output unit 140 together with a mark 40B of the second user.

Then, when the first user states "I see. That is a good idea", the voice information acquisition unit 101 acquires voice information of the statement of the first user, and the voice information processing unit 200 converts the voice information into text data 50C1 and outputs statement text data 50A2 to the output unit 140 together with the mark 40A.

Then, when a third user states "I see. That is a good idea", the voice information acquisition unit 101 acquires voice information of a statement of a user C, and the voice information processing unit 200 converts the voice information into text data, and outputs text data 50C1 of the statement to the output unit 140 together with a mark 40C of the third user. As described above, the information processing device 10 detects a statement of each user, performs a display thereof as text data, and makes it possible to check the statements in time series.

When checking the text data 50A1 output to the output unit 140 and determining that the text data 50A1 corresponds to a "problem proposal", users participating in the conference input classification information indicating that the text data 50A1 corresponds to the "problem proposal". When acquiring the classification information indicating the correspondence to the "problem proposal", the classification information acquisition unit 104 assigns a mark 70A indicating the "problem proposal" to the text data 50A1 displayed on the output unit 140, and causes the output unit 140 to perform a display thereof.

In addition, in a case of checking the text data 50B1 of a statement of a user B which text data is output to the output unit 140, and determining that the text data 50B1 corresponds to "problem handling", the users participating in the conference input classification information of the "problem handling". When acquiring the classification information of the "problem handling", the classification information acquisition unit 104 assigns a mark 70B indicating the "problem handling" to the text data 50B1 output to the output unit 140, and causes the output unit 140 to perform a display thereof.

In addition, in a case where the mark 70B indicating the "problem handling" is output to the output unit 140, the users participating in the conference can assign classification information of a "satisfaction level" and a "problem resolution level" to the text data 50B1 of the statement of the user B to which text data the mark 70B of the "problem handling" is assigned. In a case of acquiring the classification information of the "satisfaction level", the classification information acquisition unit 104 assigns a mark 70C indicating the "satisfaction level" to the text data 50B1 output to the output unit 140, and causes a display thereof. In a case of acquiring the classification information of the "problem resolution level", the classification information acquisition unit 104 assigns a mark 70D indicating the "problem resolution level" to the text data 50B1 output to the output unit 140, and causes the output unit 140 to perform a display thereof.

In addition, in the information processing device 10, the user information processing unit 111 calculates a satisfaction level on the basis of voice information, biological information, and image information of the users participating in the conference, and displays a graph 41 of the calculated satisfaction level. The graph 41 indicates a temporal change in the satisfaction level with a horizontal axis representing time and a vertical axis representing the satisfaction level. The satisfaction level calculation unit 600 calculates an "entire conference satisfaction level" by adding up, with respect to all the users participating in the conference, total values of the satisfaction levels which total values are respectively calculated for the users participating in the conference. As a result, it becomes possible to grasp the satisfaction levels of the users participating in the currently ongoing conference while the conference is in progress, and it is possible to support management of the conference.

In such a manner, the information processing device 10 can make it possible to easily identify contents of the conference by setting the problem proposal, the problem handling, the satisfaction level, and the problem resolution level as the classification information and making it possible to assign the classification information to text data on the basis of inputs by the users. Furthermore, assignment of the classification information is not necessarily performed during the conference, and an input thereof may be performed after the conference. The information processing device 10 stores the acquired text information, classification information, and the like in the minutes database unit 122.

2. Analysis and Learning Based on User Information

The information processing device 10 performs learning in the first learning unit 1131 by using the information in the minutes database unit 122, and creates a first learned model. Specifically, learning is performed by utilization of text data generated from voice in the minutes database unit 122 and classification information assigned to the text data, and a first learning model in which the text data is an input and the classification information is an output is created. Furthermore, the first learning unit 1131 may use biological information and image information as inputs in addition to the text data. As a result, the first learning model classifies whether a statement of a user is a problem proposal or a solution proposal. In addition, the first learned model also assigns a satisfaction level with respect to the statement of the user. By adjusting a data set at the time of the learning, the first learning unit 1131 can set information to be assigned as the classification information depending on a use.

The information processing device 10 performs learning in the second learning unit 1132 by using the information in the minutes database unit 122, and creates a second learned model. The second learning unit 1132 performs learning with the user information including the voice information, the biological information, the image information, and the classification information acquired by the user information acquisition unit 100 being an input and with the minutes data 1221 being an output, and creates a second learning model. An input of the second learned model includes at least the voice information and the classification information, and preferably includes the biological information and the image information furthermore. In addition, relevance information to be output is whether an ongoing conference is the "successful conference" or the "unsuccessful conference", and to which of patterns the conference corresponds in a case of the unsuccessful conference. Furthermore, the relevance information also includes information of a conference similar to the ongoing conference.

3. Analysis of User Information, and Creation of Classification Information Based on Learning The information processing device 10 creates classification information with respect to the ongoing conference by using the automatic classification unit 114 that executes processing by the first learned model. The automatic classification unit 114 acquires information indicating which one of the "problem proposal", the "problem handling", and "others" the text data is classified into. Furthermore, in a case where the text data of the statement is classified into the "problem handling", by using the first learned model, the automatic classification unit 114 calculates, with respect to the text data of the "problem handling", how many users among the users participating in the conference assign the classification information of the "satisfaction level" to the text data. By executing the above processing, the classification information assigned by the users in the above-described processing of FIG. 6 can be assigned by the automatic classification unit 114. By classifying the statement of the users, the automatic classification unit 114 can notice a statement of a "problem" or "problem handling" overlooked by the users participating in the conference and can support management of the conference. In addition, the automatic classification unit 114 can calculate a satisfaction level of the "problem handling" by using the first learning model, and can provide more useful information as reference information of the conference.

The information processing device 10 can process the text data (statement) classified by the automatic classification unit 114 by the natural language processing unit 112, evaluate contents of the statement, and output a result thereof.

Figure 7:
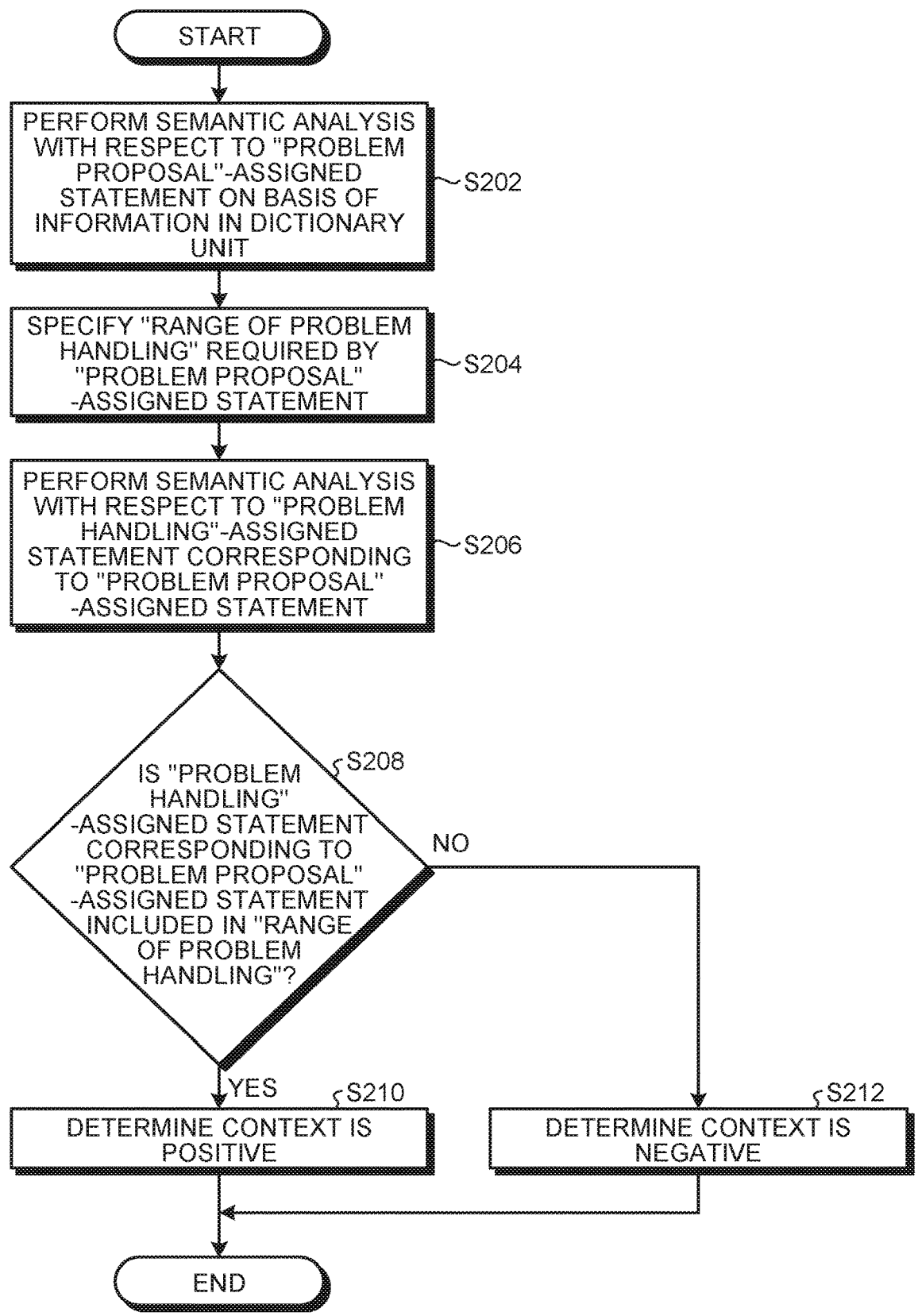
FIG. 7 is a flowchart for describing a procedure of information processing by a natural language processing unit.

FIG. 7 is a flowchart for describing a procedure of information processing by the natural language processing unit. Processing in which the natural language processing unit 112 evaluates contents of the text classified as the problem proposal by the automatic classification unit 114 is illustrated in FIG. 7. The context analysis unit 1123 of the natural language processing unit 112 performs a semantic analysis of meaning of text data of a "problem proposal"-assigned statement by using meaning of words recorded in the dictionary unit 124 (Step S202). On the basis of a result of the semantic analysis, the context analysis unit 1123 specifies a "range of problem handling" required by the "problem proposal" (Step S204). Similarly, the context analysis unit 1123 analyzes meaning of text data of a "problem handling"-assigned statement (Step S206). It is determined whether the meaning of the text data of the "problem handling"-assigned statement is included in the "range of problem handling" described above (Step S208). In a case where the meaning of the text data of the "problem handling"-assigned statement is included in the "range of problem handling" described above (Step S208; Yes), the context analysis unit 1123 determines that the context is positive (Step S210). In a case where the meaning of the text data of the "problem handling"-assigned statement is not included in the "range of problem handling" (Step S208; No), the context analysis unit 1123 determines that the context is negative (Step S212).

On the basis of information of results of the analysis, the information processing device 10 can evaluate a statement and acquire an evaluation result. By outputting a determination result indicating whether an appropriate "problem handling"-assigned statement is made with respect to a "problem proposal"-assigned statement of a user participating in the currently ongoing conference, it becomes possible to check an evaluation of the statement in the conference. Thus, it is possible to support management of the conference.

4. Analysis of User Information, and Evaluation and Proposal Based on Learning

The information processing device 10 acquires the user information of the currently ongoing conference, and the conference progress prediction unit 115 evaluates whether the conference becomes successful or not by processing the acquired information by the second learned model. FIG. 8 is a description diagram for describing definitions of the "successful conference" and the "unsuccessful conference". As illustrated in FIG. 8, the "unsuccessful conference" is classified into a pattern A to pattern E, and the "successful conference" is defined as a pattern F and a pattern G in the present embodiment.

The conference of the pattern A is a case where the users participating in the conference give no opinion on a "subject". That is, this is a case where the users participating in the conference make no statement.

The conference of the pattern B is a case where the users participating in the conference repeat statements in a different field with respect to a "subject" of the conference and discussion is not settled.

The conference of the pattern C is a case where a user participating in the conference makes, with respect to a "problem proposal", a statement classified as "problem handling" included in a "range of problem handling" required by the "problem proposal" and discussion is coming into conclusion to perform the "problem handling", but actually, the problem proposed by the "problem proposal"-assigned statement cannot be solved even when the "problem handling" is performed. In other words, it can be said that this is a case where it is found that the problem proposed by the "problem proposal"-assigned statement cannot be solved when the "problem handling" that is the conclusion of the conference is actually performed after the conference.

The conference of the pattern D is defined as a case where a part of the users participating in the conference is not actually satisfied although all the users participating in the conference apparently agree with "problem handling" proposed in the conference, and a discussion on the same "subject" is repeated in another conference. The conference of the pattern E is defined as a case where the users participating in the conference cannot notice a "problem" to be solved in the conference and later notice that the "problem" is to be solved in the conference, and a conference is set for the "problem". A case where a conference applies to the definitions of the conferences of the pattern A to the pattern E described above is defined as the "unsuccessful conference".

The conference of the pattern F is defined as a case that does not apply to the definitions of the conferences of the pattern A to the pattern E and a pattern G. The conference of the pattern G is a case where the second satisfaction level calculated by the second satisfaction level calculation unit 302 included in the biological information processing unit 300 with respect to the biological information acquired by the biological information acquisition unit 102 is 25 or higher (positive), the context analysis unit 1123 determines that a relationship of a "problem handling"-assigned statement corresponding to a "problem proposal"-assigned statement is positive after the voice information processing unit 200 converts the voice information acquired by the voice information acquisition unit 101 into the text data, and the number of the users who participate in the conference and assign the classification information of the "satisfaction level" and the "problem resolution level" to the "problem handling"-assigned statement is equal to or larger than a majority of the users participating in the conference.

FIG. 9 is a flowchart illustrating a procedure of information processing by the conference progress prediction unit according to the present disclosure. A procedure of the information processing by the conference progress prediction unit 115 will be described with reference to FIG. 9. The user information acquired by the user information acquisition unit 100 with respect to the currently ongoing conference is input to the second learned model included in the conference progress prediction unit 115, and relevance information of the currently ongoing conference is inferred (Step S102). On the basis of the relevance information output by the second learned model, it is determined whether the currently ongoing conference corresponds to the "unsuccessful conference" (Step S104).

In a case where the conference progress prediction unit 115 determines that the currently ongoing conference corresponds to the "unsuccessful conference" (Step S104; YES), it is checked to which pattern the relevance information inferred by the second learned model applies (Step S106). In a case where the relevance information is the pattern A (Step S106; pattern A), the conference progress prediction unit 115 calculates a problem resolution level prediction value as 0 (Step S110). In a case where the relevance information is the pattern B (Step S106; pattern B), the conference progress prediction unit 115 calculates a problem resolution level prediction value as 10 (Step S112). In a case where the relevance information is the pattern C (Step S106; pattern C), the conference progress prediction unit 115 calculates a problem resolution level prediction value as 30 (Step S114). In a case where the relevance information is the pattern D (Step S106; pattern D), the conference progress prediction unit 115 calculates a problem resolution level prediction value as 50 (Step S116). In a case where the relevance information is the pattern E (Step S106; pattern E), the conference progress prediction unit 115 calculates a problem resolution level prediction value as 50 (Step S118).

In a case of determining that the currently ongoing conference does not correspond to the "unsuccessful conference" (Step S104; NO), the conference progress prediction unit 115 determines whether the biological information acquired by the biological information acquisition unit 102 from the users in the currently ongoing conference is positive (that is, second satisfaction level calculated by the second satisfaction level calculation unit 302 included in the biological information processing unit 300 is 25 or higher (positive)), the context analysis unit 1123 determines a relationship of the "problem handling"-assigned statement corresponding to the "problem proposal"-assigned statement is positive, and the number of users who assign the "satisfaction level" and the "problem resolution level" is equal to or larger than the majority of the users participating in the conference (Step S108). In a case where Step S108 is YES (Step S108; Yes), the conference progress prediction unit 115 calculates a problem resolution level as 100 (Step S120).

In a case where Step S108 is No (Step S108; No), the conference progress prediction unit 115 calculates a problem resolution level as 60 (Step S122).

As described above, the conference progress prediction unit 115 calculates the problem resolution level prediction value according to the relevance information inferred by the second learned model. By outputting the problem resolution level prediction value, the information processing device 10 can notify the users of the evaluation result of the problem resolution level of the proposal in the currently ongoing conference, and can support the progress of the conference.

Figure 10:
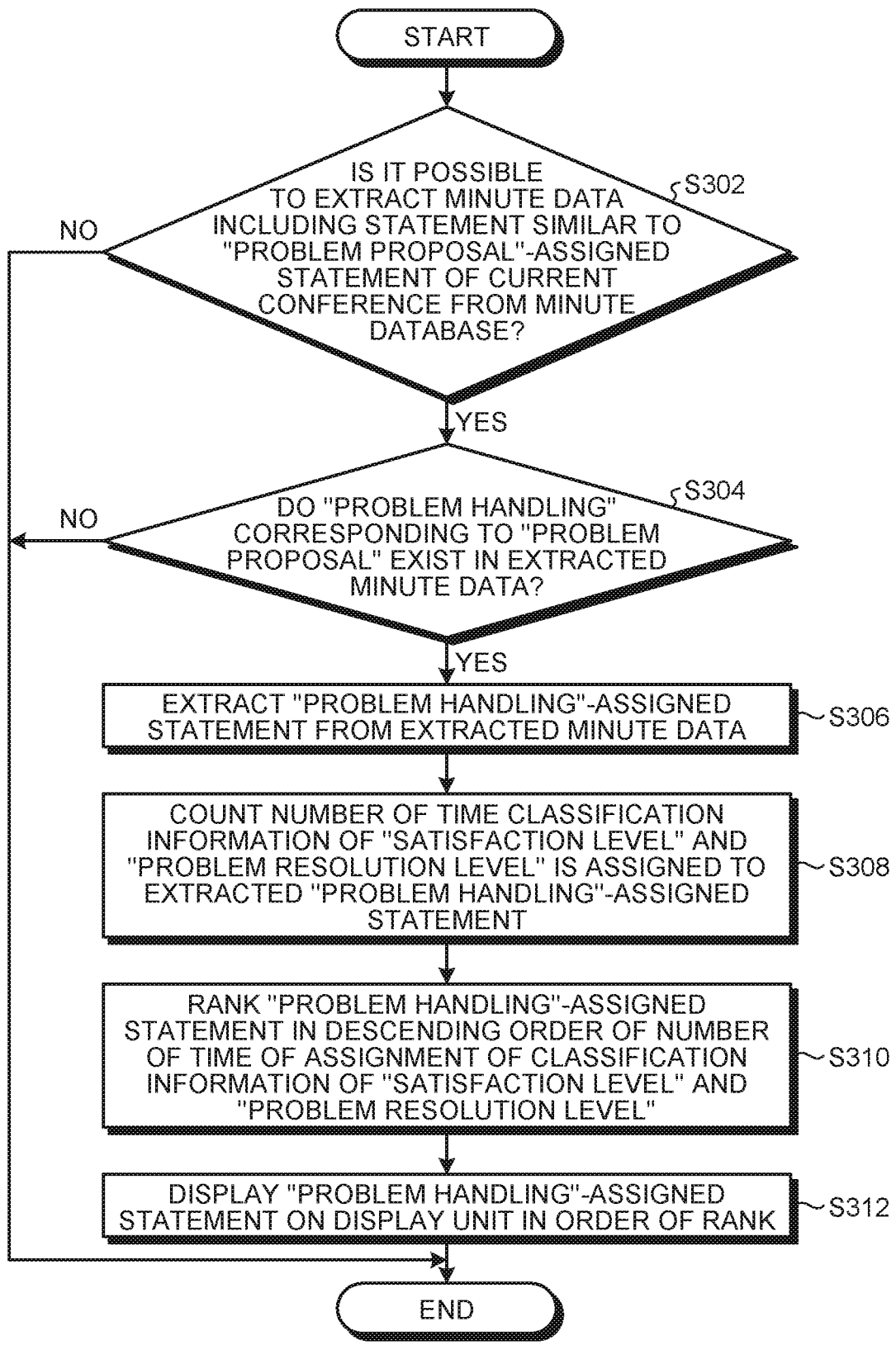
FIG. 10 is a flowchart illustrating a procedure of information processing by a proposal unit.

The information processing device 10 performs classification on the basis of the user information of the currently ongoing conference, and the proposal unit 116 makes a proposal on the basis of a classification result. FIG. 10 is a flowchart illustrating a procedure of information processing by the proposal unit. The information processing by the proposal unit 116 will be described in detail with reference to FIG. 10. When the classification information of the "problem proposal" is assigned to text data of a statement, the proposal unit 116 searches text data to which the classification information of the "problem proposal" is assigned and which is included in past minutes data 1221 recorded in the minutes database unit 122, and checks whether there is minutes data 1221 including text data of a past "problem proposal"-assigned statement similar to the "problem proposal"-assigned statement in the currently ongoing conference (Step S302). In a case where there is the minutes data 1221 including the similar "problem proposal"-assigned statement in the minutes database unit 122 (Step S302; Yes), the proposal unit 116 checks whether the minutes data 1221 including the "problem proposal"-assigned statement includes text data of a "problem handling"-assigned statement corresponding to the "problem proposal"-assigned statement (Step S304). In a case where there is the text data of the "problem handling"-assigned statement corresponding to the "problem proposal"-assigned statement (Step S304; Yes), the proposal unit 116 extracts the text data of the "problem handling"-assigned statement (Step S306). The proposal unit 116 counts the number of times of assignment of the classification information of the "satisfaction level" and the "problem resolution level" to the extracted text data of the "problem handling"-assigned statement (Step S308). The proposal unit 116 ranks pieces of the extracted text data of the "problem handling"-assigned statements in descending order of the number of times of assignment of the classification information of the "satisfaction level" and the "problem resolution level" (Step S310). The proposal unit 116 outputs, to the output unit 140, the top three pieces of the text data of the "problem handling"-assigned statements in the rank (Step S312).

In a case where the minutes data 1221 including the "problem proposal"-assigned statement similar to the "problem proposal"-assigned statement in the currently ongoing conference does not exist in the minutes database unit 122 (Step S302; No), the proposal unit 116 ends the information processing. In a case where the text data of the "problem handling"-assigned statement corresponding to the "problem proposal"-assigned statement does not exist in the minutes data 1221 extracted in Step S304 (Step S304; No), the proposal unit 116 ends the information processing.

The information processing device 10 can support resolution of the "problem" in the currently ongoing conference by selecting a proposal on the basis of contents of the classified problem and information of the minutes data in the past by using the first learning model. Furthermore, the information processing device 10 may execute learning in the proposal unit 116 and create a proposal acquired by arrangement of the past proposal on the basis of past information.

Here, the determination criterion of the patterns is an example, and is not limited to the above. Regarding whether the currently ongoing conference is the conference classified into the pattern A, the currently ongoing conference may be predicted as the conference classified into the pattern A in a case where a determination result of the context analysis unit 1123 of the natural language processing unit 112 is negative. Regarding whether the currently ongoing conference is a conference classified into the pattern B, the currently ongoing conference may be predicted as the conference classified into the pattern C in a case where the voice information processing unit 200 converts voice information acquired from the users participating in the conference into text data and text data of a statement is not generated for 10 minutes or more. In addition, regarding whether the currently ongoing conference is a conference classified into the pattern D, the currently ongoing conference may be predicted as the conference classified into the pattern D in a case where there is at least one user whose second satisfaction level and fourth satisfaction level are not consistent among the users participating in the conference.

Figure 11:
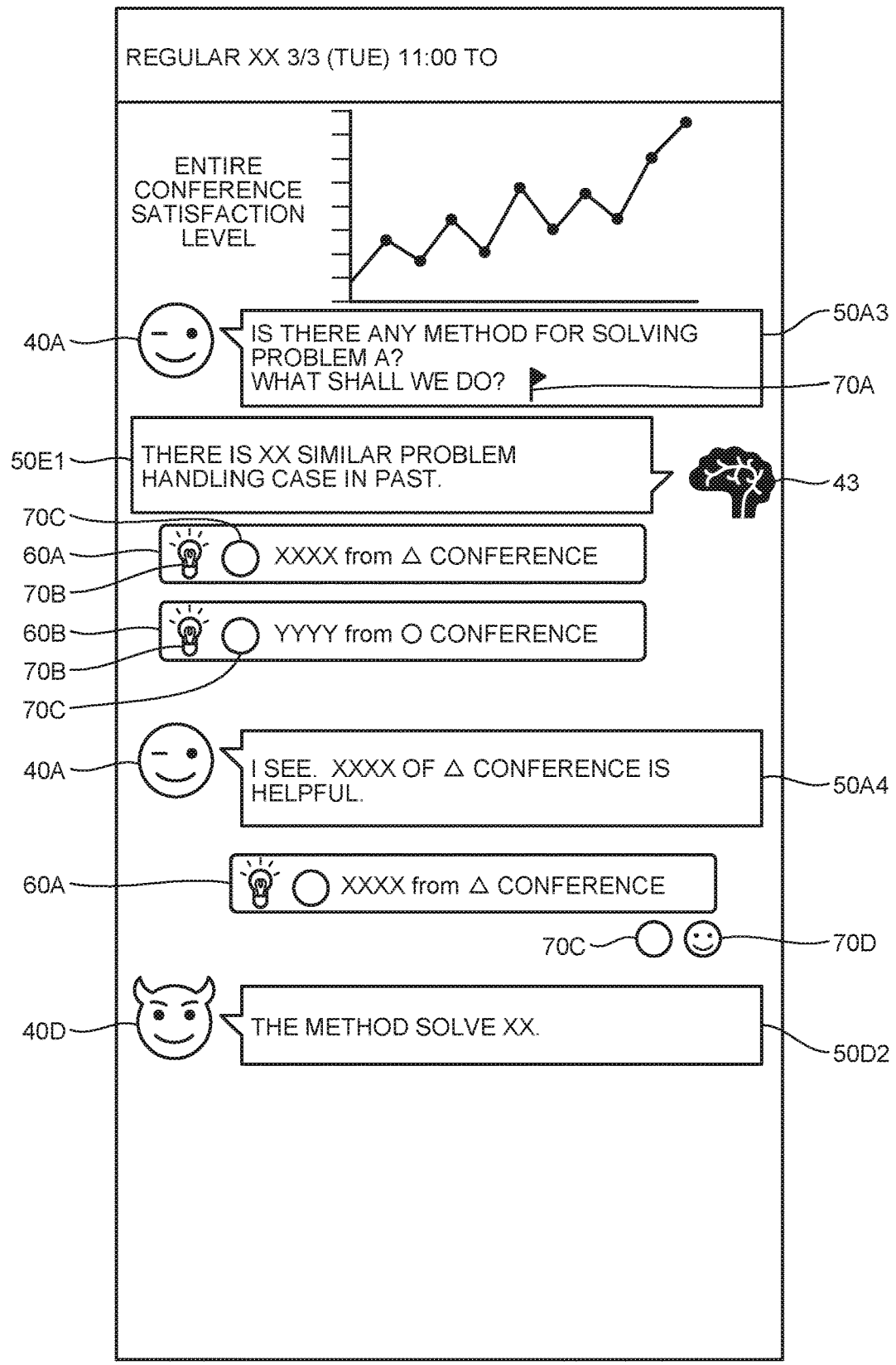
FIG. 11 is a description diagram for describing a function of the proposal unit.

FIG. 11 is a description diagram for describing a function of the proposal unit. The function of the proposal unit 116 will be described with reference to FIG. 11. The first user participating in the conference states "Is there any method for solving a problem A? What shall we do?", and a mark 70A of the classification information of the "problem proposal" is assigned to text data 50A3 of the statement together with the mark 40A of the first user.

In the conference support system 1, the analysis unit 110 analyzes the user information, and the satisfaction level calculation unit 600 calculates the entire conference satisfaction level. In a case where the calculated entire conference satisfaction level is decreased, the proposal unit 116 infers a proposal for a conference body.

The proposal unit 116 executes processing on the text data 50A3 and creates the proposal. The proposal unit 116 outputs text data 50E1 "There are XX similar problem handling cases in the past" together with a mark 43. Furthermore, the proposal unit 116 outputs proposals 60A and 60B corresponding to the text data 50A3 of the "problem proposal". Here, the proposal unit 116 displays the proposals 60A and 60B in order of ranks.

In a case of determining that the proposal 60A and the proposal 60B can resolve the problem, the users participating in the conference assign the classification information of the "problem resolution level" thereto. In addition, in a case where the users participating in the conference feel satisfied with the "problem handling", the classification information of the "satisfaction level" is assigned. In the present embodiment, since the classification information of the "problem resolution level" and the "satisfaction level" is assigned to the proposal 60A, a mark 70C indicating the "problem resolution level" and a mark 70D indicating the "satisfaction level" are displayed below the proposal 60A.

In such a manner, the information processing device 10 can smoothly progress the conference by making a proposal for the problem. In addition, the information processing device 10 stores, into the minutes database unit 122, the classification information input with respect to the proposal during the conference. As a result, usage for learning in the first learning unit 1131 is possible.

Figure 12:
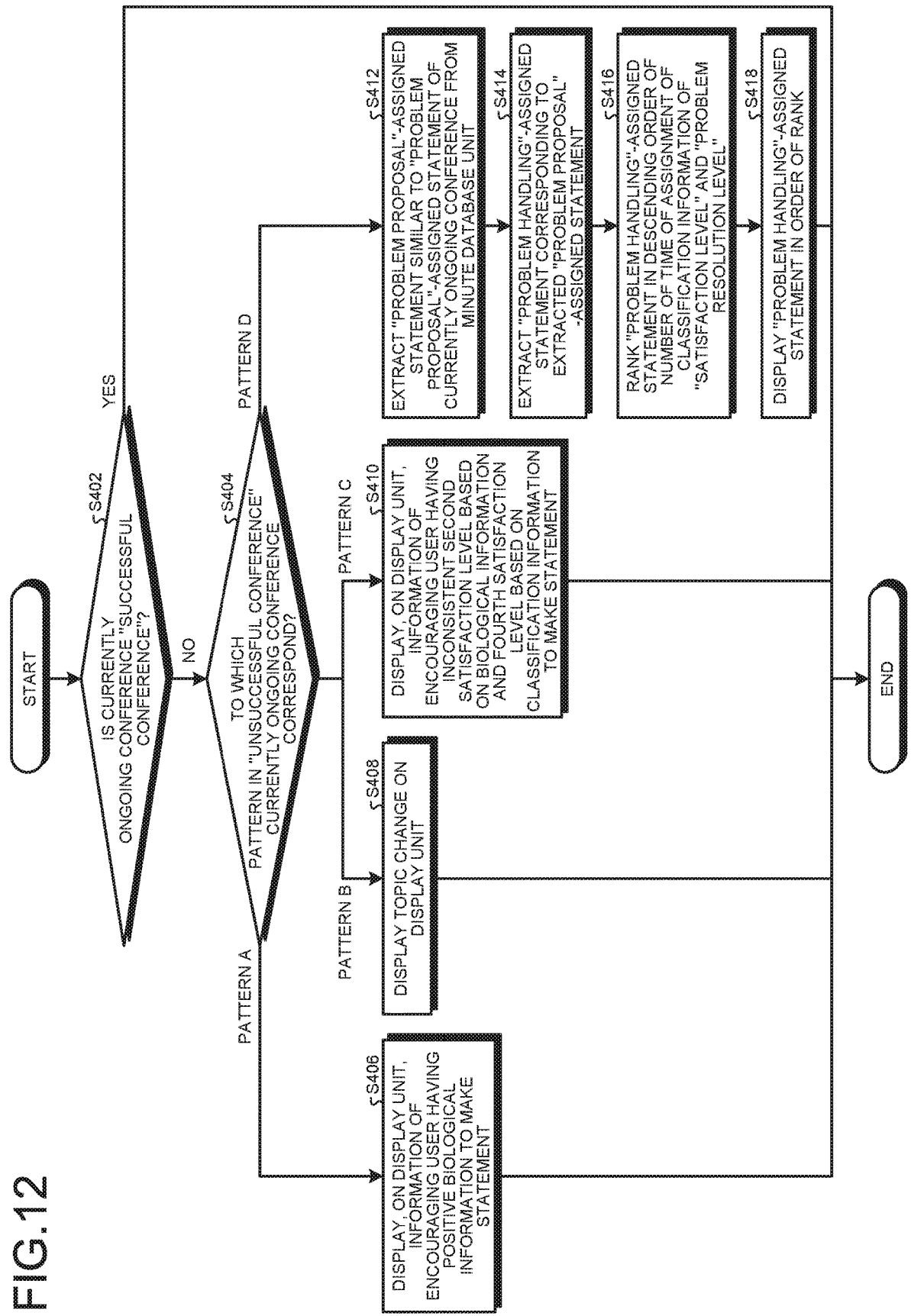
FIG. 12 is a flowchart illustrating information processing by the proposal unit according to the present disclosure.

Furthermore, the information processing device 10 may evaluate the currently ongoing conference on the basis of user information of the conference, and make a proposal by the proposal unit 116 in a case of the unsuccessful conference. FIG. 12 is a flowchart illustrating a procedure of information processing by the proposal unit 116. A procedure of another example of the information processing by the proposal unit 116 will be described with reference to FIG. 12. The information processing device 10 determines, by a problem resolution level prediction unit 1152, whether the currently ongoing conference is the "successful conference" (Step S402).

In the information processing device 10, in a case where the conference progress prediction unit 115 predicts that the currently ongoing conference corresponds to the "successful conference" (Step S404; Yes), the proposal unit 116 ends the information processing.

In the information processing device 10, in a case where the conference progress prediction unit 115 predicts that the currently ongoing conference does not correspond to the "successful conference" (Step S404; No), that is, in a case where it is predicted that the conference corresponds to the "unsuccessful conference", it is determined which pattern of the "unsuccessful conference" the currently ongoing conference is classified into (Step S404). In a case where the problem resolution level prediction unit 1152 determines that the currently ongoing conference corresponds to the conference of the pattern A (Step S404; pattern A), the proposal unit 116 causes the output unit 140 to display, for example, "What kind of opinion do you have, Mr. OO?" in such a manner as to encourage a user whose second satisfaction level calculated by the second satisfaction level calculation unit 302 included in the biological information processing unit 300 is 25 or higher (positive) to make a statement. In a case where the conference progress prediction unit 115 determines that the currently ongoing conference corresponds to the conference of the pattern B (Step S404; pattern B), the proposal unit 116 causes the output unit 140 to display a "topic change" (Step S408). In a case where the conference progress prediction unit 115 determines that the currently ongoing conference corresponds to the conference of the pattern C (Step S404; pattern C), the proposal unit 116 causes the output unit 140 to display information encouraging a user whose second satisfaction level based on the biological information and fourth satisfaction level based on the classification information are not consistent to make a statement (such as "Are you sure to agree with this opinion, Mr. OO?") (Step S410). In a case where it is determined that the currently ongoing conference corresponds to the conference of the pattern D, the proposal unit 116 extracts a "problem proposal"-assigned statement similar to a "problem proposal"-assigned statement in the currently ongoing conference from the minutes database unit 122 (Step S412). When the "problem proposal"-assigned statement similar to the "problem proposal"-assigned statement is extracted, the proposal unit 116 extracts a "problem handling"-assigned statement corresponding to the "problem proposal"-assigned statement from the minutes database unit 122 (Step S414). The proposal unit 116 ranks the extracted "problem handling"-assigned statements in descending order of the number of times of assignment of the classification information of the "satisfaction level" and the "problem resolution level" (Step S416). When the "problem handling"-assigned statements are ranked, the proposal unit 116 displays the "problem handling"-assigned statements on the output unit 140 in order of the ranks (Step S418). As a result, it is possible to support the currently ongoing conference to be successful.

Figure 13:
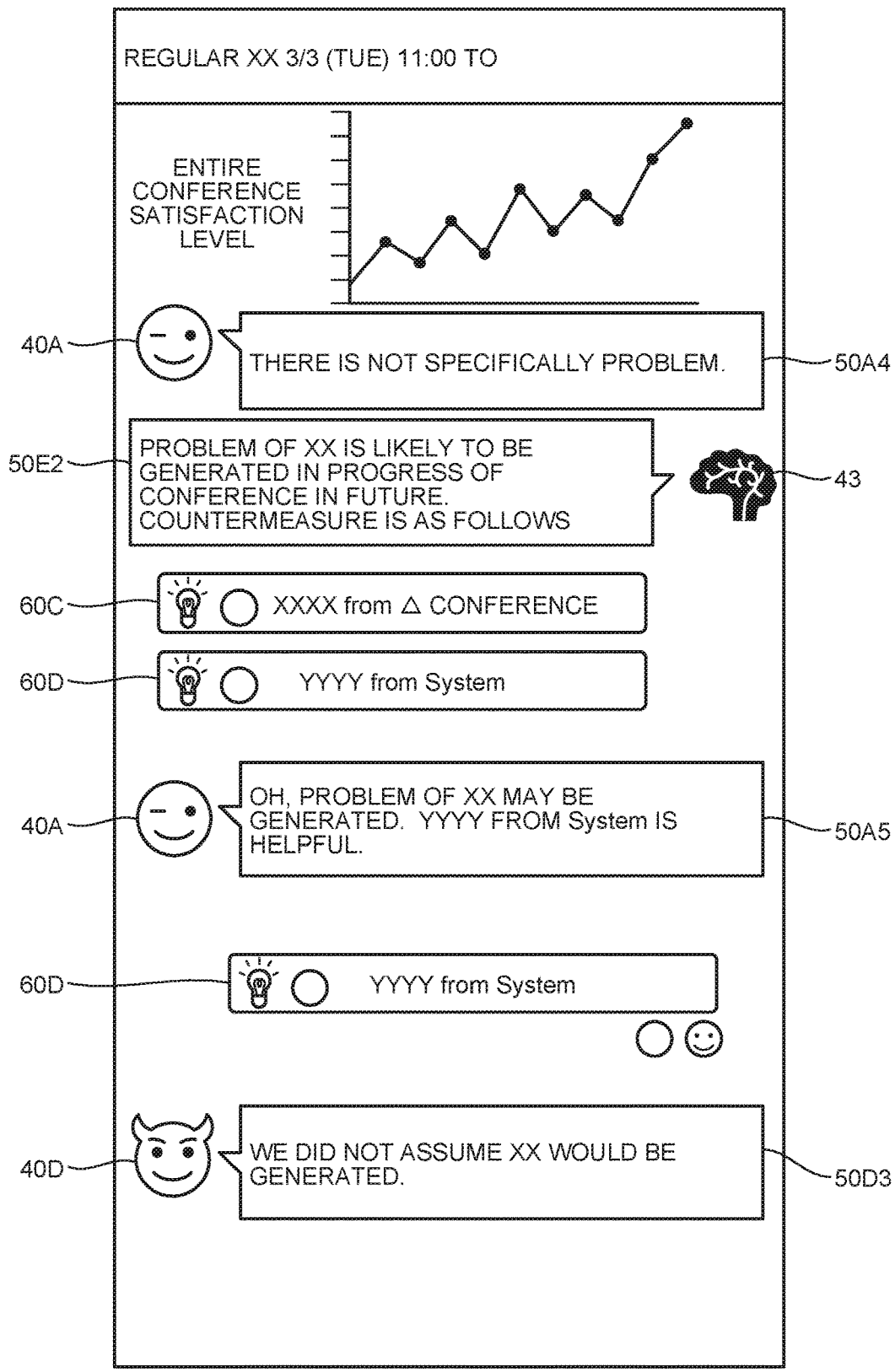
FIG. 13 is a description diagram for describing the function of the proposal unit.

FIG. 13 is a description diagram for describing the function of the proposal unit. The function of the proposal unit 116 will be described in detail with reference to FIG. 13. When the first user participating in the conference states "There is not specifically a problem", text data 50A4 of the statement is output to the output unit 140 together with the mark 40A of the first user.

In the information processing device 10, the conference progress prediction unit 115 determines a status of the conference on the basis of the user information of the currently ongoing conference, and the proposal unit 116 extracts minutes data 1221 including a "problem proposal"-assigned statement similar to the "problem proposal"-assigned statement in the currently ongoing conference in a case where the conference progress prediction unit 115 infers that the currently ongoing conference corresponds to the "unsuccessful conference" although discussion is about to be settled. The proposal unit 116 extracts, from the extracted minutes data 1221, a related "problem proposal"-assigned statement although the "problem" is not discussed in the currently ongoing conference. The proposal unit 116 extracts, from the extracted minutes data 1221, a "problem handling"-assigned statement corresponding to the "problem proposal"-assigned statement.

When the extraction is completed, the proposal unit 116 causes text data 50E2 "A problem of XX is likely to be generated in the progress of the conference in the future. Countermeasures are as follows" to be displayed together with the mark 43. In addition, the proposal unit 116 respectively outputs, to the output unit 140, the extracted related "problem proposal"-assigned statement as a proposal 60C and the "problem handling"-assigned statement corresponding to the related "problem proposal"-assigned statement as a proposal 60D.

When the first user checks the proposal 60C and the proposal 60D displayed on the output unit 140 and states "Oh, the problem of XX may be generated. YYYY from the System may be helpful", text data 50A5 of the statement is output to the output unit 140. Then, when another user participating in the conference states "We did not assume that XX would be generated", the output unit 140 is caused to output text data 50D3 of the statement together with a mark 40D of another user.

After a statement of a user A, when the users participating in the conference determine that the proposal 60D has been helpful for problem resolution and assign the classification information of the "problem resolution level" thereto, a proposal 60D1 is displayed after the text data 50A5, and the mark 70C indicating the "problem resolution level" is displayed. With respect to the proposal 60D1, the users participating in the conference cause the mark 70D indicating the "satisfaction level" to be displayed below the proposal 60D1 after the statement of the user A. The information processing device 10 stores, into the minutes database unit 122, the classification information input with respect to the proposals during the conference. As a result, usage for learning in the second learning unit 1132 is possible.

A method of preparing past minutes data of a case where minutes of a conference are recorded on paper will be described. Paper minutes are scanned, and data converted into portable document format (PDF) data is subjected to optical character recognition (OCR) and converted into text data. Then, the minutes data 1221 may be created by assignment of classification information to the text data of each of statements by the users.

Furthermore, in a case where minutes of a conference are recorded as electronic data that mainly includes text data of statements of the users and does not include voice information, biological information, image information, and classification information, the information processing device 10 may directly assign the classification information to the text data by using the automatic classification unit 114, which includes the first learned model generated by the learning unit 113, with respect to the electronic data including the text data.

The information processing device 10 may be a GPU server including a plurality of graphics processing units (GPU) with respect to various kinds of arithmetic processing. The GPUs are processors suitable for performing typical and enormous calculation processing. By using the GPU server, it is possible to efficiently perform learning in the learning unit 113.

Although the first learning unit 1131 performs learning with the satisfaction level being included as the classification information and assigns the satisfaction level with respect to the statement during the conference as the classification information in the above embodiment, this is not a limitation. It is only necessary for the first learning unit 1131 to detect at least whether a statement of a user is a problem proposal or problem handling. As a result, the conference support system 1 can check when the problem proposal and the problem handling are made in the statement during the conference.

Note that the present technology can also have the following configurations.

(1)

A conference support system including:
 a user information acquisition unit that acquires voice information of each of users; and
 an analysis unit that generates text data of each user statement on a basis of the voice information, wherein
 the user information acquisition unit acquires classification information of a problem proposal or problem handling assigned by the users to the text data of the user statement, and acquires classification information of a satisfaction level or a problem resolution level assigned by the users to the text data to which the classification information of the problem proposal or the problem handling is assigned.

(2)

The conference support system according to (1), further including
 a learning unit that generates a first learned model in which a relationship between the text data of the user statement and the classification information is learned, and
 an automatic classification unit that inputs the text data of the user statement to the first learned model, infers the classification information assigned to the text data of the user statement, and assigns information of the problem proposal or the problem handling to the text data of the user statement in a conference body.

(3)

The conference support system according to (2), wherein
 the analysis unit calculates satisfaction levels of the users participating in a conference on a basis of user information including voice information, biological information, or image information of the users.

(4)

The conference support system according to (3), wherein the analysis unit calculates a problem resolution level prediction value of a currently ongoing conference on a basis of the user information.

(5)

The conference support system according to (4), further including
a minutes database unit that stores minutes data of a conference which data includes relevance information indicating whether the conference becomes successful or unsuccessful, wherein
the learning unit includes a second learning unit that learns the minutes data and generates a second learned model in which the user information is an input and the relevance information is an output.

(6)

The conference support system according to (5), wherein the analysis unit includes a proposal unit that processes the minutes data included in the minutes database unit by using the user information of the currently ongoing conference, and that outputs a proposal for the conference body which proposal is generated from an analysis result of the minutes data.

(7)

The conference support system according to (6), wherein the proposal unit processes the minutes data included in the minutes database unit by using the problem resolution level prediction value, and outputs the proposal for the conference body.

(8)

The conference support system according to (7), wherein the user information acquisition unit acquires classification information assigned by the users to the proposal of the proposal unit, and
the learning unit performs relearning of the first learned model by using data to which the proposal of the proposal unit and the classification information are added.

(9)

A conference support method including the steps of:
acquiring voice information of a user;
converting a statement of the user from the voice information into text data;
acquiring classification information with respect to the text data;
learning relevance between the classification information and the text data and generating a first learned model; and
automatically assigning the classification information to the text data by using the first learned model.

(10)

A conference support program for causing a computer to execute the steps of
acquiring voice information of a user,
converting a statement of the user from the voice information into text data,
acquiring classification information with respect to the text data,
learning relevance between the classification information and the text data and generating a first learned model, and
automatically assigning the classification information to the text data by using the first learned model.

Note that the effects described in the present description are merely examples and are not limitations, and there may be a different effect.

REFERENCE SIGNS LIST

10 INFORMATION PROCESSING DEVICE
100 USER INFORMATION ACQUISITION UNIT
101 VOICE INFORMATION ACQUISITION UNIT
102 BIOLOGICAL INFORMATION ACQUISITION UNIT
103 IMAGE INFORMATION ACQUISITION UNIT
104 CLASSIFICATION INFORMATION ACQUISITION UNIT
110 ANALYSIS UNIT
111 USER INFORMATION PROCESSING UNIT
112 NATURAL LANGUAGE PROCESSING UNIT
113 LEARNING UNIT
114 AUTOMATIC CLASSIFICATION UNIT
115 CONFERENCE PROGRESS PREDICTION UNIT
116 PROPOSAL UNIT
120 STORAGE UNIT
121 USER INFORMATION STORAGE UNIT
122 MINUTES DATABASE UNIT
123 CORPUS UNIT
124 DICTIONARY UNIT
130 COMMUNICATION UNIT
131 TRANSMISSION UNIT
132 RECEPTION UNIT
140 OUTPUT UNIT

The invention claimed is:

1. A conference support system, comprising:
a processor configured to:
acquire voice information of each user of a plurality of users;
generate, based on the voice information, text data of each user statement of a plurality of user statements of the plurality of users;
acquire first classification information assigned by the plurality of users to the text data of each user statement of the plurality of user statements;
generate a first learned model by learning relevance between the first classification information and the text data;
train the first learned model, based on supervised learning, using at least one of the voice information, biological information of at least one user of the plurality of users, or image information of at least one user of the plurality of users; and
automatically assign second classification information to the text data based on the trained first learned model.

2. The conference support system according to claim 1, wherein the processor is further configured to:
input the text data to the first learned model;
infer the second classification information assigned to the text data; and
assign information of at least one of a problem proposal or a problem handling to the text data of a user statement, of the plurality of user statements, in a conference body.

3. The conference support system according to claim 2, wherein the processor is further configured to:
calculate satisfaction levels of the plurality of users participating in a conference based on user information including at least one of the voice information, the biological information, or the image information.

4. The conference support system according to claim 3, wherein the processor is further configured to:
calculate a problem resolution level prediction value of the conference based on the user information.

5. The conference support system according to claim 4, wherein the processor is further configured to:
   store minutes data of the conference, wherein the minutes data includes relevance information indicating whether the conference becomes one of successful or unsuccessful;
   learn the minutes data; and
   generate, based on the learned minutes data, a second learned model in which the user information is an input and the relevance information is an output.

6. The conference support system according to claim 5, wherein the processor is further configured to:
   process the minutes data based on the user information of the conference; and
   output a proposal for the conference body based on the minutes data.

7. The conference support system according to claim 6, wherein the processor is further configured to:
   process the minutes data based on the problem resolution level prediction value.

8. The conference support system according to claim 7, wherein the processor is further configured to:
   acquire third classification information assigned by the plurality of users to the proposal; and
   perform a relearning operation of the first learned model, based on data to which the proposal and the third classification information are added.

9. A conference support method, comprising:
   acquiring voice information of each user of a plurality of users;
   generating, based on the voice information, text data of statement of each user statement of a plurality of user statements of the plurality of users;
   acquiring first classification information assigned by the plurality of users to the text data of each user statement of the plurality of user statements;
   generating a first learned model by learning relevance between the first classification information and the text data;
   training the first learned model, based on supervised learning, using at least one of the voice information, biological information of at least one user of the plurality of users, or image information of at least one user of the plurality of users; and
   automatically assigning second classification information to the text data based on the first learned model.

10. A non-transitory computer-readable medium having stored thereon, computer-executable instructions which, when executed by a computer, cause the computer to execute operations, the operations comprising:
   acquiring voice information of each user of a plurality of users;
   generating, based on the voice information, text data of statement of each user statement of a plurality of user statements of the plurality of users;
   acquiring first classification information assigned by the plurality of users to the text data of each user statement of the plurality of user statements;
   generating a first learned model by learning relevance between the first classification information and the text data;
   training the first learned model, based on supervised learning, using at least one of the voice information, biological information of at least one user of the plurality of users, or image information of at least one user of the plurality of users; and
   automatically assigning second classification information to the text data based on the first learned model.

* * * * *